US009332229B2

(12) United States Patent
Ishimoto

(10) Patent No.: US 9,332,229 B2
(45) Date of Patent: May 3, 2016

(54) SURROUNDING AREA MONITORING DEVICE FOR MONITORING AREA AROUND WORK MACHINE

(75) Inventor: Hidefumi Ishimoto, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 627 days.

(21) Appl. No.: 13/704,933

(22) PCT Filed: Jun. 20, 2011

(86) PCT No.: PCT/JP2011/064065
§ 371 (c)(1),
(2), (4) Date: Dec. 17, 2012

(87) PCT Pub. No.: WO2011/158955
PCT Pub. Date: Dec. 22, 2011

(65) Prior Publication Data
US 2013/0088593 A1    Apr. 11, 2013

(30) Foreign Application Priority Data

Jun. 18, 2010  (JP) ................................. 2010-139088

(51) Int. Cl.
*H04N 7/18* (2006.01)
*E02F 9/22* (2006.01)
*E02F 9/24* (2006.01)
*E02F 9/26* (2006.01)
*G06K 9/00* (2006.01)

(52) U.S. Cl.
CPC  *H04N 7/18* (2013.01); *E02F 9/226* (2013.01); *E02F 9/24* (2013.01); *E02F 9/26* (2013.01); *E02F 9/261* (2013.01); *G06K 9/00805* (2013.01)

(58) Field of Classification Search
CPC ....................................................... H04N 7/18
USPC ........................................................... 348/143
See application file for complete search history.

(56) References Cited

U.S. PATENT DOCUMENTS

2003/0021490 A1 *  1/2003  Okamoto .................. B60R 1/00
                                                          382/284

(Continued)

FOREIGN PATENT DOCUMENTS

JP      2002-327470 A    11/2002
JP        2007-85091 A     4/2007

(Continued)

OTHER PUBLICATIONS

Google Patent search history.pdf.*

(Continued)

*Primary Examiner* — William C Vaughn, Jr.
*Assistant Examiner* — Luis Perez Fuentes
(74) *Attorney, Agent, or Firm* — Crowell & Moring LLP

(57) ABSTRACT

A surrounding area monitoring device for monitoring an area around a work machine displays an immediate range display image as a bird's eye view image indicating the immediate area surrounding the work machine from above the work machine and a wide range display image indicating a wide area including a predetermined range outside the immediate area, selectively. The wide range display image is displayed if a position of a worker is not located within a monitoring area. The immediate range display image is displayed if the position of the worker is located within the monitoring area. The immediate range display image is the bird's eye view image set around the schematic graphic image of the work machine. The wide range display image is an image including a reduced immediate range display image and an image showing the conditions outside the immediate area in the schematic graphic representation.

9 Claims, 22 Drawing Sheets

(56) References Cited

U.S. PATENT DOCUMENTS

| | | | | |
|---|---|---|---|---|
| 2005/0004762 A1* | 1/2005 | Takaham | ............... | G01S 17/936 701/301 |
| 2008/0231702 A1* | 9/2008 | Matsumoto | ............... | B60R 1/00 348/148 |
| 2010/0171828 A1* | 7/2010 | Ishii | ............... | B60R 1/00 348/135 |
| 2012/0327239 A1* | 12/2012 | Inoue | ............... | B60R 1/00 348/148 |
| 2014/0088824 A1* | 3/2014 | Ishimoto | ............... | E02F 9/0841 701/34.4 |

FOREIGN PATENT DOCUMENTS

| | | |
|---|---|---|
| JP | 2008-163719 A | 7/2008 |
| JP | 2008-248613 A | 10/2008 |
| JP | 2009-121053 A | 6/2009 |
| JP | 2010-198519 A | 9/2010 |
| WO | WO 2006/106685 A1 | 10/2006 |

OTHER PUBLICATIONS

International Search Report dated Sep. 27, 2011 (two (2) pages).

* cited by examiner

FIG.4

| | | FIXED DATA | | | CHANGEABLE DATA | | | | |
|---|---|---|---|---|---|---|---|---|---|
| ID | NAME | WORK DETAILS | WORK AREA | UPDATE DATE/TIME | ENTRY STATUS | ENTRY POSITION | ENTRY DETAILS | FRONT WORK UNIT FRONT-END POSITION | TRAVELING SPEED |
| ... | ... | ... | ... | ... | ... | ... | ... | ... | ... |
| P3 | JOHN SMITH | ASSISTANCE | A | 2008/9/19 8:37 | NO | — | APPROACHING | — | — |
| P4 | FRANK JONES | ASSISTANCE | A, B | 2008/9/19 8:37 | YES | REAR | APPROACHING | EXTENDING | HIGH | → WIDE RANGE DISPLAY
| P5 | BILL CLARK | ASSISTANCE | B, C, E | 2008/9/19 8:38 | YES | LEFT | ENTERED | CONTRACTING | LOW | → IMMEDIATE RANGE DISPLAY
| P6 | HENRY FORD | DUMPING OPERATION | B, C, E | 2008/9/19 8:38 | NO | — | NO ENTRY | — | — |
| ... | ... | ... | ... | ... | ... | ... | ... | ... | ... |

FIG.13

| CURRENT STATUS | TRIGGER CONDITION | NEXT STATUS |
|---|---|---|
| NO ENTRY | ENTERED WARNING RANGE 113 | APPROACHING |
| NO ENTRY | ENTERED FIRST ALARM RANGE 112a | ENTERED |
| APPROACHING | EXITED WARNING RANGE 113 | NO ENTRY |
| APPROACHING | ENTERED FIRST ALARM RANGE 112a | ENTERED |
| ENTERED | EXITED SECOND ALARM RANGE 112b INTO WARNING RANGE 113 | APPROACHING |
| ENTERED | EXITED WARNING RANGE 113 | NO ENTRY |

FIG.14

| CURRENT STATUS | TRIGGER CONDITION | NEXT STATUS |
|---|---|---|
| EXTENDING | ENTERED FIRST ALARM RANGE 112a | CONTRACTING |
| CONTRACTING | EXITED SECOND ALARM RANGE 112b INTO WARNING RANGE 113 | EXTENDING |

FIG.15

| CURRENT STATUS | TRIGGER CONDITION | NEXT STATUS |
|---|---|---|
| STATIONARY | TRAVELING LEVER OPERATED | LOW |
| LOW | TRAVELING LEVER NOT OPERATED | STATIONARY |
| LOW | 5 km/hr OR HIGHER | HIGH |
| HIGH | 4 km/hr OR LOWER | LOW |

SURROUNDING AREA MONITORING DEVICE FOR MONITORING AREA AROUND WORK MACHINE

TECHNICAL FIELD

The present invention relates to a surrounding area monitoring device for monitoring an area around a work machine.

BACKGROUND ART

There are areas surrounding a work machine such as a hydraulic excavator that cannot be visually checked with ease by an operator in the operator's cab. Namely, the operator cannot see the areas to the left, to the right and to the rear of the operator's cab. For this reason, it is desirable to install a monitoring device that monitors those areas for any obstacle or person that may be present in order to prevent accidents.

Work machine monitoring devices known in the related art include the following (patent literature 1). A proximity sensor that detects an object present within a monitoring area around a work machine and an imaging device that captures an image of a detection target area allocated to the proximity sensor are installed in the work machine in the related art. The monitoring device is capable of determining the position of an object present in the monitoring area based upon the length of time elapsing before an ultrasound wave output from the proximity sensor is reflected by the object. Upon detecting that there is an object in the monitoring area, the monitoring device displays information indicating the position of the object, together with the image captured by the imaging device as described above, at a display device.

CITATION LIST

Patent Literature

Patent literature 1: Japanese Laid Open Patent Publication No. 2002-327470

SUMMARY OF THE INVENTION

Technical Problems

In the monitoring system disclosed in the publication cited above, no information is brought up on display at the display device until the proximity sensor detects an object present within the monitoring area. Thus, while a significant monitoring effect can be achieved when the monitoring area is set over a wide range, a greater monitoring area is bound to necessitate the monitoring operation to be executed more frequently over a greater length of time, which, in turn, will lead to lowered work efficiency. If, on the other hand, the monitoring area is set over a narrower range immediately surrounding the work machine, the monitoring effect will be compromised.

Solution to Problem

According to the 1st aspect of the present invention, a surrounding area monitoring device for monitoring an area around a work machine comprises: a display device; a worker position detection unit that detects a position of a worker working around the work machine; an image capturing unit mounted at the work machine, which obtains a surrounding area image by capturing an image of an area around the work machine; an image conversion unit that converts the surrounding area image of the area around the work machine, obtained by the image capturing unit, to a bird's eye view image of the work machine; an image generation unit that generates a monitor image based upon the bird's eye view image resulting from conversion via the image conversion unit and the position of the worker detected by the worker position detection unit; a display control unit that displays the monitor image at the display device; a decision-making unit that makes a decision as to whether or not the position of the worker is located within a monitoring area set in advance; and a plurality of work machine condition detection units that detect an attitude of the work machine including a work machine traveling speed at which the work machine is traveling or drive conditions of the work machine, wherein: the image generation unit generates a plurality of monitor images which show conditions within monitoring ranges with varying sizes based upon results of the decision made by the decision-making unit or information provided from at least one of the work machine condition detection units, the monitoring ranges being set around the work machine.

According to the 2nd aspect of the present invention, it is preferred that in the surrounding area monitoring device for monitoring an area around a work machine according to the 1st aspect, the plurality of monitor images include an immediate range display image showing conditions in an immediate area set around the work machine and a wide range display image showing conditions in a wide area containing the immediate area, also set around the work machine.

According to the 3rd aspect of the present invention, the decision-making unit of the surrounding area monitoring device for monitoring an area around a work machine according to the 2nd aspect may make a decision as to whether or not the position of the worker is located within the monitoring area by setting the wide area as the monitoring area.

According to the 4th aspect of the present invention, the decision-making unit of the surrounding area monitoring device for monitoring an area around a work machine according to the 2nd aspect may make a decision as to whether or not the position of the worker is located within the monitoring area by setting the immediate area as the monitoring area.

According to the 5th aspect of the present invention, the surrounding area monitoring device for monitoring an area around a work machine according to any one of the 2nd through 4th aspects, may further comprise: a first input unit that accepts an operation performed to enlarge or reduce the wide range display image currently on display at the display device, wherein: the image generation unit alters a size of the wide range display image while the operation is accepted via the first input unit.

According to the 6th aspect of the present invention, the surrounding area monitoring device for monitoring an area around a work machine according to any one of the 2nd through 5th aspects, may further comprise a second input unit that enables a user to manually select either the immediate range display image or the wide range display image.

According to the 7th aspect of the present invention, it is preferred that in the surrounding area monitoring device for monitoring an area around a work machine according to any one of the 2nd through 6th aspects, if the decision-making unit decides that the position of the worker is not located within the monitoring area, the image generation unit generates the wide range display image and the display control unit brings up the wide range display image on display at the display device.

According to the 8th aspect of the present invention, it is preferred that in the surrounding area monitoring device for monitoring an area around a work machine according to any one of the 2nd through 6th aspects, the work machine includes an extensible front work unit; and even if the decision-making unit decides that the position of the worker is located within the monitoring area, the image generation unit generates the wide range display image and the display control unit brings up the wide range display image on display at the display device as long as the front work unit is detected to be extending via the work machine condition detection units.

According to the 9th aspect of the present invention, it is preferred that in the surrounding area monitoring device for monitoring an area around a work machine according to any one of the 2nd through 6th aspects, the work machine includes an extensible front work unit; and even if the decision-making unit decides that the position of the worker is located within the monitoring area and the front work unit is detected to be contracting via the work machine condition detection units, the image generation unit generates the wide range display image and the display control unit brings up the wide range display image on display at the display device once the work machine traveling speed is detected to be higher than a predetermined speed via the work machine condition detection units.

According to the 10th aspect of the present invention, it is preferred that in the surrounding area monitoring device for monitoring an area around a work machine according to any one of the 1st through 9th aspects, the immediate range display image generated by the image generation unit is a bird's eye view image and the wide range display image is a display image that includes an image obtained by reducing the bird's eye view image and an image that shows conditions in a specific range outside the immediate area in schematic representation.

Advantageous Effect of the Invention

According to the present invention, an optimal monitor image among a plurality of monitor images of areas different ranges set around the work machine, is generated and brought up on display based upon whether or not a worker is working within the monitoring area around the work machine, the traveling speed at which the work machine is currently traveling or the working attitude currently assumed by the work machine. As a result, an advantage is achieved in that optimal information indicating the current conditions around the work machine can be provided to the operator.

BRIEF DESCRIPTION OF THE DRAWINGS

FIG. 4 The contents of the data in the database held in the information holding unit in FIG. 3

FIG. 13 A diagram indicating how the contents of data recorded in the entry details field in FIG. 4 may be updated when conditions shift from the current status to the next status FIG. 14 A diagram indicating how the contents of data recorded in the front work unit front-end position field in FIG. 4 may be updated when conditions shift from the current status to the next status FIG. 15 A diagram indicating how the contents of data recorded in the traveling speed field in FIG. 4 may be updated when conditions shift from the current status to the next status FIG. 16 A flowchart of the decision-making processing executed by the entry decision-making unit with regard to worker entry FIG. 17 A flowchart of the display range selection processing executed by the display control unit FIG. 18 A flowchart of the wide area monitor image generation processing executed by the display control unit FIG. 19 A flowchart of the immediate area monitor image generation processing executed by the display control unit FIG. 20 A display image brought up on display to allow the operator to select a manual mode for enlarging or reducing the monitor image on display at the display device FIG. 21 A display image brought up on display after the operator has selected the manual mode for enlarging or reducing the monitor image on display at the display device FIG. 22 A display image brought up by enlarging the monitor image in FIG. 21 through a manual operation FIG. 23 A monitor image that includes another example of worker marks that may be brought up on display when workers working around the work machine are present within the wide range monitoring area FIG. 24 A monitor image brought up on display when a worker in the monitor image in FIG. 23 has moved into the immediate range monitoring area

DESCRIPTION OF EMBODIMENT

The following is a description, given in reference to drawings, of an embodiment of the surrounding area monitoring device for monitoring an area around a work machine according to the present invention.

Figure 1:
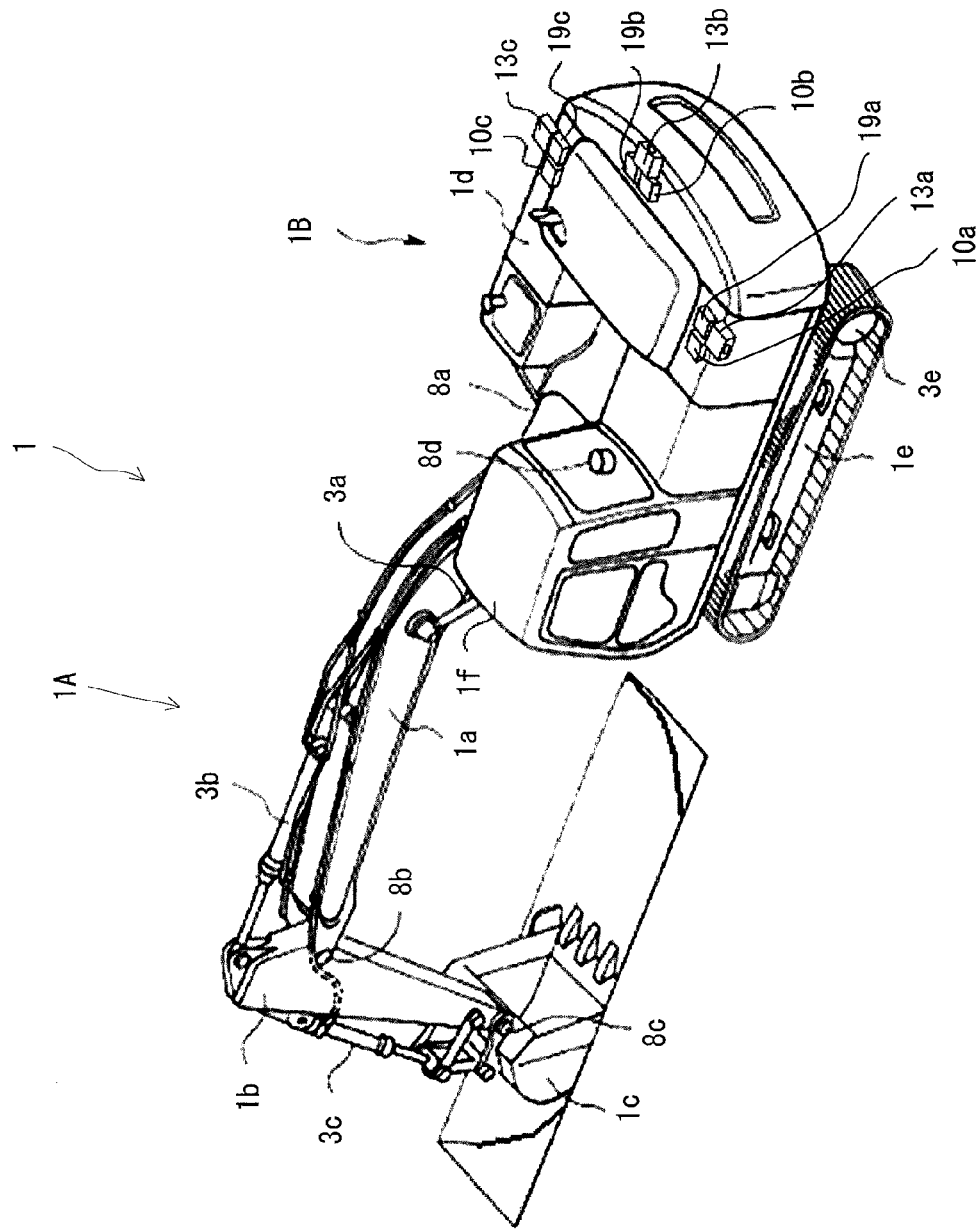
FIG. 1 A perspective of the surrounding area monitoring device for monitoring an area around a work machine achieved in embodiment 1 of the present invention FIG. 2 An illustration showing how an image of an area around the work machine shown in FIG. 1 and position information indicating the position of a worker may be obtained FIG. 3 A block diagram of an overall system that includes the surrounding area monitoring device for monitoring an area around the work machine shown in FIG. 1

FIG. 1 is a perspective presenting an external view of a work machine 1. The work machine 1 in the embodiment is a hydraulic excavator. Reference numeral 1A indicates a front work unit, reference numeral 1B indicates a body, reference numeral 1a indicates a boom, reference numeral 1b indicates an arm, reference numeral 1c indicates a bucket, reference numeral 1d indicates a revolving superstructure (body frame), reference numeral 1e indicates a traveling superstructure and reference numeral 1f indicates an operator's cab. The work machine 1 is configured with the articulated front work unit 1A, constituted with the boom 1a, the arm 1b and the bucket 1c, which individually rotate along the vertical direction, and the body 1B constituted with the revolving superstructure 1d and the traveling superstructure 1e.

At the front work unit 1A, the base end of the boom 1a is rotatably supported at the front portion of the revolving superstructure 1d, one end of the arm 1b is rotatably supported at the front end of the boom 1a and the bucket 1c is rotatably supported at the other end of the arm 1b. The boom 1a is driven via boom cylinders 3a so as to rotate along the vertical direction, the arm 1b is driven via an arm cylinder 3b so as to rotate along the vertical direction, and the bucket 1c is driven via a bucket cylinder 3c so as to rotate along the vertical direction. At the body 1B, the revolving superstructure 1d, which includes the operator's cab 1f, is mounted atop the traveling superstructure 1e via a revolving motor 3d (not shown in FIG. 1; see FIG. 3). As the revolving motor 3d is driven, the revolving superstructure 1d is caused to revolve relative to the traveling superstructure 1e. The traveling superstructure 1e is driven via a traveling motor 3e. Another set of traveling superstructure 1e and traveling motor 3e is disposed on the other side of the body 1B. The two traveling motors 3e are driven independently of each other. As the two traveling motors 3e are driven simultaneously or one at a time, the corresponding traveling superstructures 1e are driven, and thus, the work machine is able to travel forward or backward or its traveling direction can be altered.

Figure 3:
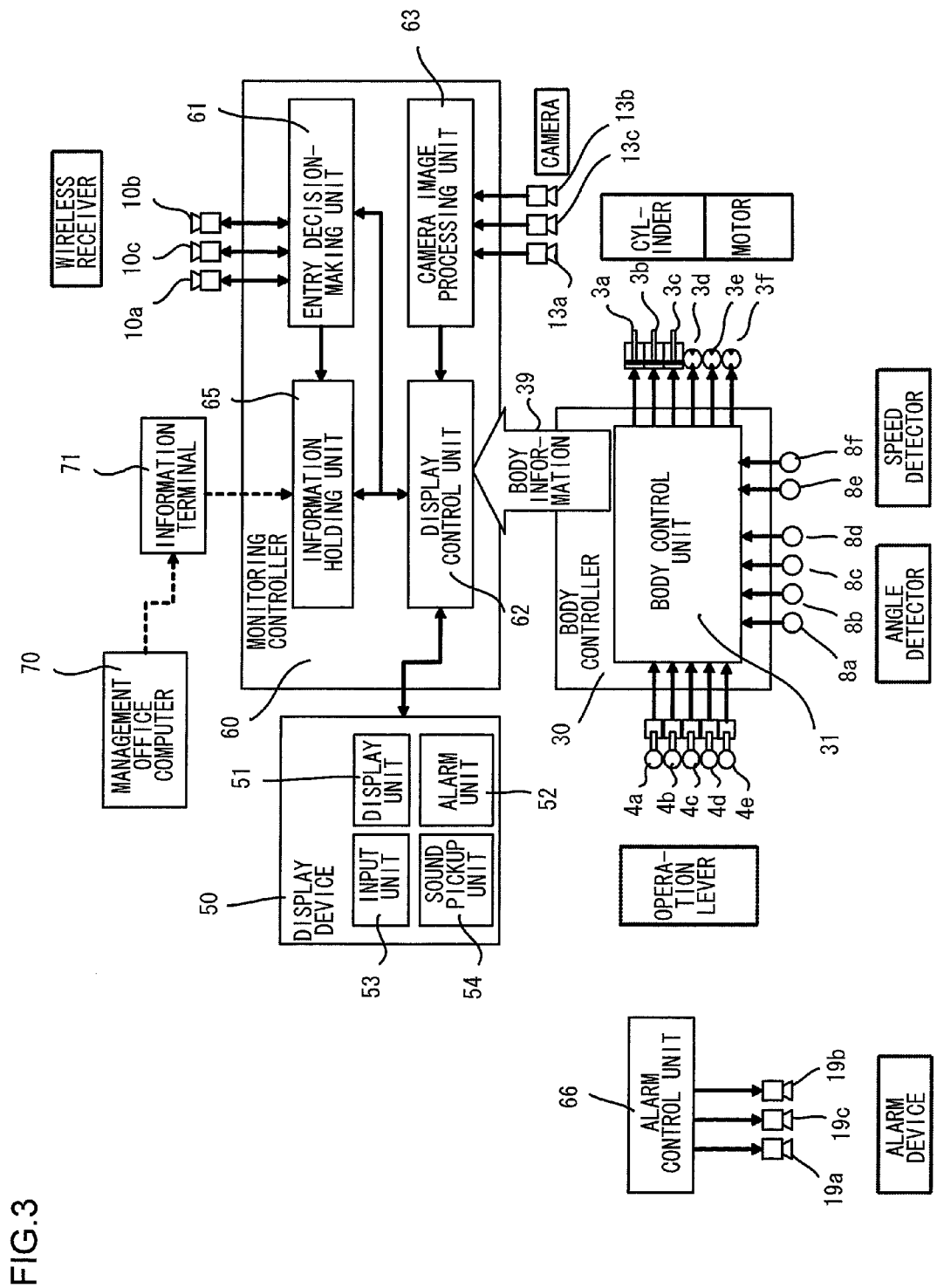

Inside the operator's cab 1f, a boom operation lever 4a, which is operated to drive the boom cylinders 3a, an arm operation lever 4b, which is operated to drive the arm cylinder 3b, a bucket operation lever 4c, which is operated to drive the bucket cylinder 3c, a revolving operation lever 4d, which is operated to drive the revolving motor for driving the revolving superstructure 1d, and a traveling motor operation lever 4e, which is operated to drive the traveling motors 3e are installed (see FIG. 3). In addition, a display device and an alarm device, which are to be described later, are installed in the operator's cab 1f.

Reference numerals 8a, 8b and 8c indicate angle detectors that detect rotational angles, disposed at the rotational fulcrums of the boom 1a, the arm 1b and the bucket 1c respectively, whereas reference numeral 8d indicates an inclining angle detector that detects the inclining angle with which the revolving superstructure 1d inclines. The angle detectors 8a through 8d are each driven by a driver (not shown). Information indicating the detected angles is displayed at a monitor installed in the operator's cab 1f.

Wireless receivers 10a, 10b and 10c, each equipped with an antenna, are mounted on the top side of the revolving superstructure 1d. The wireless receivers 10a, 10b and 10c function as worker position detectors. The wireless receiver 10a is mounted at the top of the revolving superstructure 1d on the side toward the left side surface, with its antenna turned toward the direction along which radio waves from the left side of the work machine 1 can best be received. The wireless receiver 10c is mounted at the top of the revolving superstructure 1d on the side toward the right side surface, with its antenna turned toward the direction along which radio waves from the right side of the work machine 1 can best be received. The wireless receiver 10b is mounted at the top of the revolving superstructure 1d on the side toward the rear-side surface, with its antenna turned toward the direction along which radio waves from the rear side of the work machine 1 can best be received.

In addition, alarm devices 19a, 19b and 19c are mounted in the vicinity of the wireless receivers 10a, 10b and 10c respectively, mounted on the top side of the revolving superstructure 1d. The alarm device 19a, disposed near the wireless receiver 10a, is mounted so that sound is output with a high volume toward the left side of the work machine 1. The alarm device 19c, disposed near the wireless receiver 10c, is mounted so that sound is output with a high volume toward the right side of the work machine 1. The alarm device 19b, disposed near the wireless receiver 10b, is mounted so that sound is output with a high volume toward the rear side of the work machine 1.

Reference numerals 13a, 13b and 13c indicate cameras, i.e., image-capturing units. The camera 13a, which is disposed near the wireless receiver 10a, is oriented so that it is able to capture an image over a range matching the reception range of the wireless receiver 10a. The camera 13b, which is disposed near the wireless receiver 10b, is oriented so that it is able to capture an image over a range matching the reception range of the wireless receiver 10b. The camera 13c, which is disposed near the wireless receiver 10c, is oriented so that it is able to capture an image over a range matching the reception range of the wireless receiver 10c.

The surrounding area monitoring device according to the present invention provides information indicating conditions around the work machine in the form an image of a bird's eye view taken from above the work machine. Accordingly, the number of cameras installed in the surrounding area monitoring device and the photographing directions along which the cameras capture images are determined so as to allow the conditions in the monitoring target area in real space to be displayed in the form of a bird's eye view image taken from above the work machine.

Figure 2:
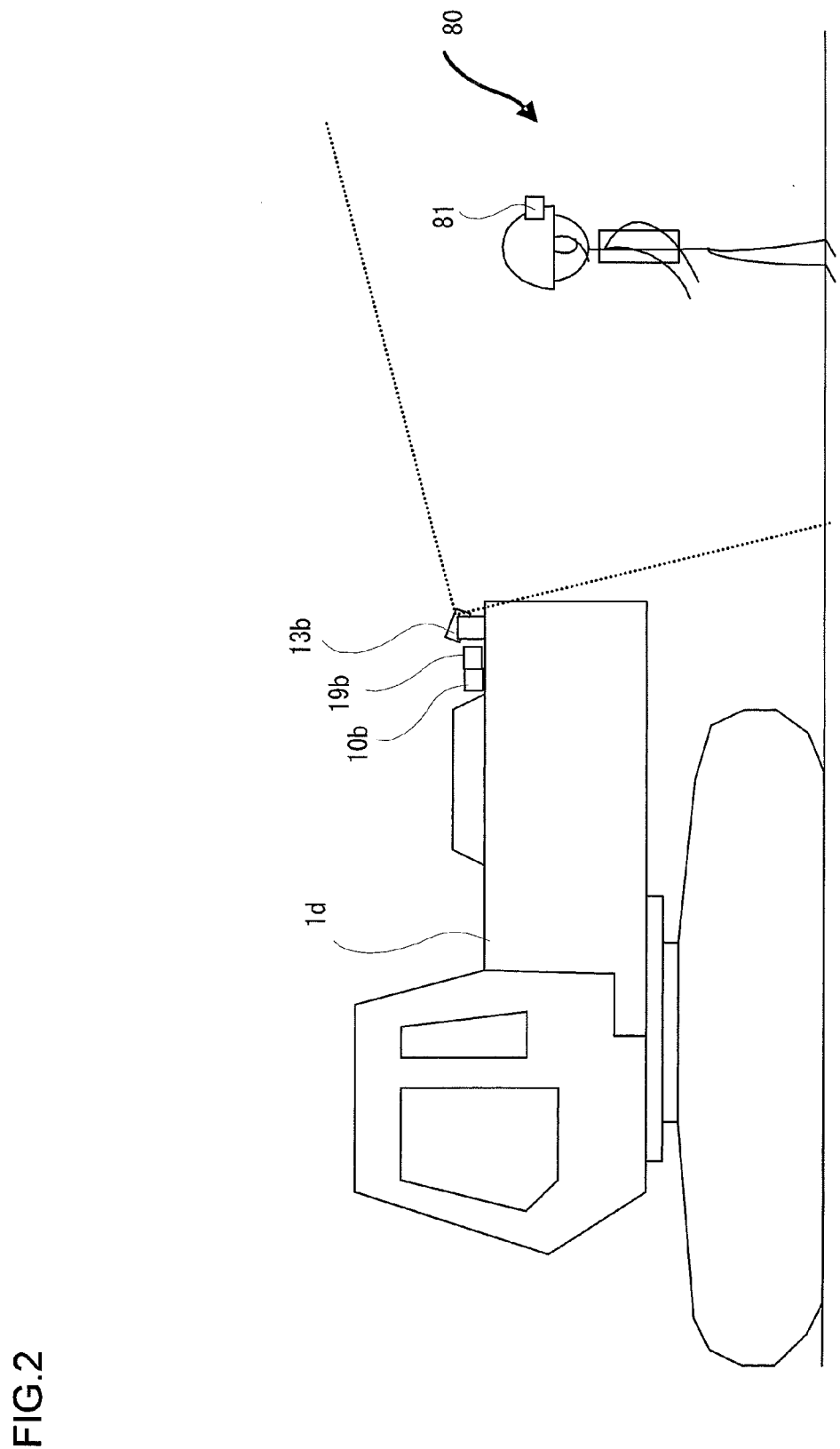

FIG. 2 schematically illustrates how an image of an area around the work machine shown in FIG. 1 and position information indicating the position of a worker may be obtained.

A worker 80 is carrying a wireless transmitter 81, which may be mounted at, for instance, a helmet. An ID (worker identification information) and the like, to be described later, are transmitted from the wireless transmitter 81. The signal is received at the wireless receivers 10a, 10b and 10c mounted at the revolving superstructure 1d. The sensitivity of each of the wireless receivers 10a, 10b and 10c is adjusted so that the signal transmitted from the wireless transmitter 81 is received at a signal level corresponding to a specific monitoring area. As shown in FIG. 2, the cameras 13a, 13b and 13c are each installed so as to be able to capture an image ranging from a point directly below the work machine 1 to a point set over a significant distance from the work machine 1.

Figure 5:
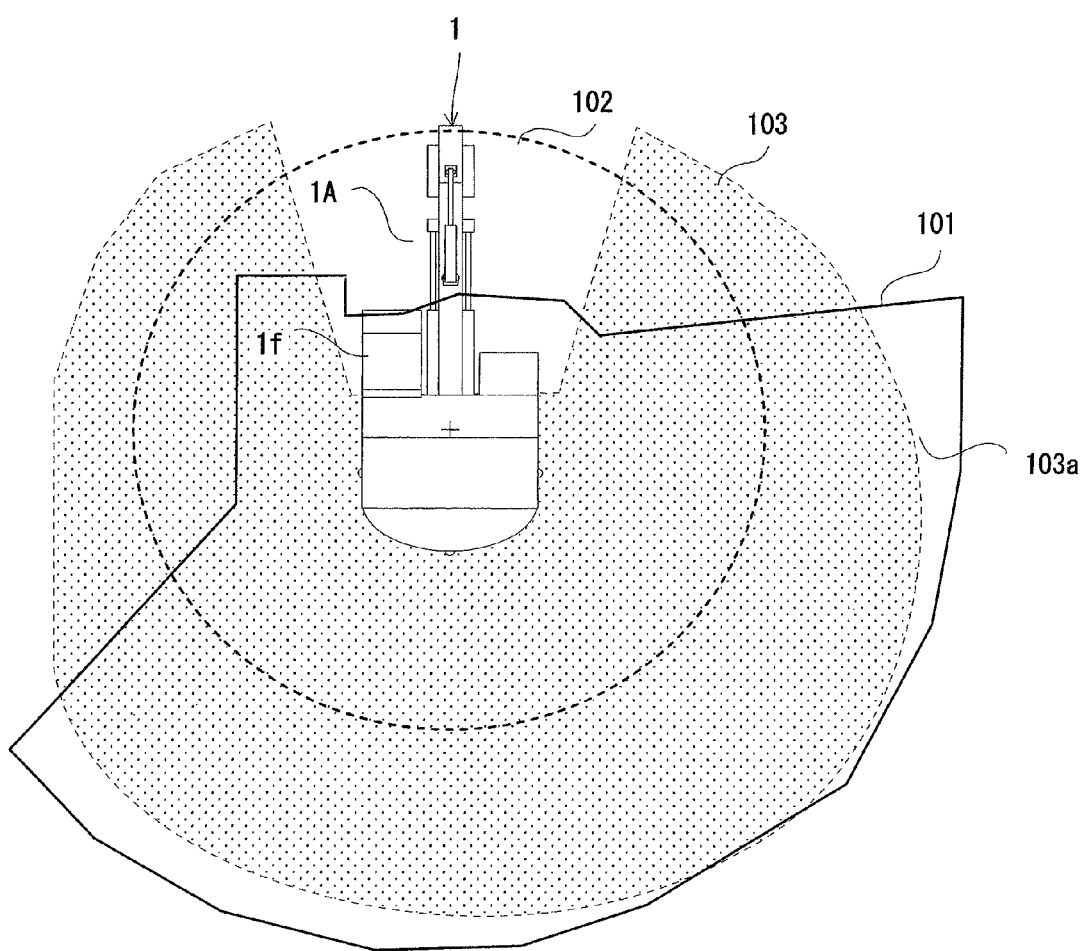
FIG. 5 A plan view illustrating how a monitoring area around the work machine may be set FIG. 6 A side elevation of the work machine shown in FIG. 5, illustrating the range over which the work machine revolves FIG. 7 A display image brought up on display at the display device in a wide-range display mode FIG. 8 A display image brought up on display at the display device in an immediate-range display mode FIG. 9 A display image brought up on display at the display device to allow the operator to set decision-making rules in a display image auto-selection mode FIG. 10 A display image brought up on display at the display device to allow the operator, having selected "worker entry" displayed in the display image in FIG. 9, set decision-making rules for the criterion "worker entry"
Figure 6:
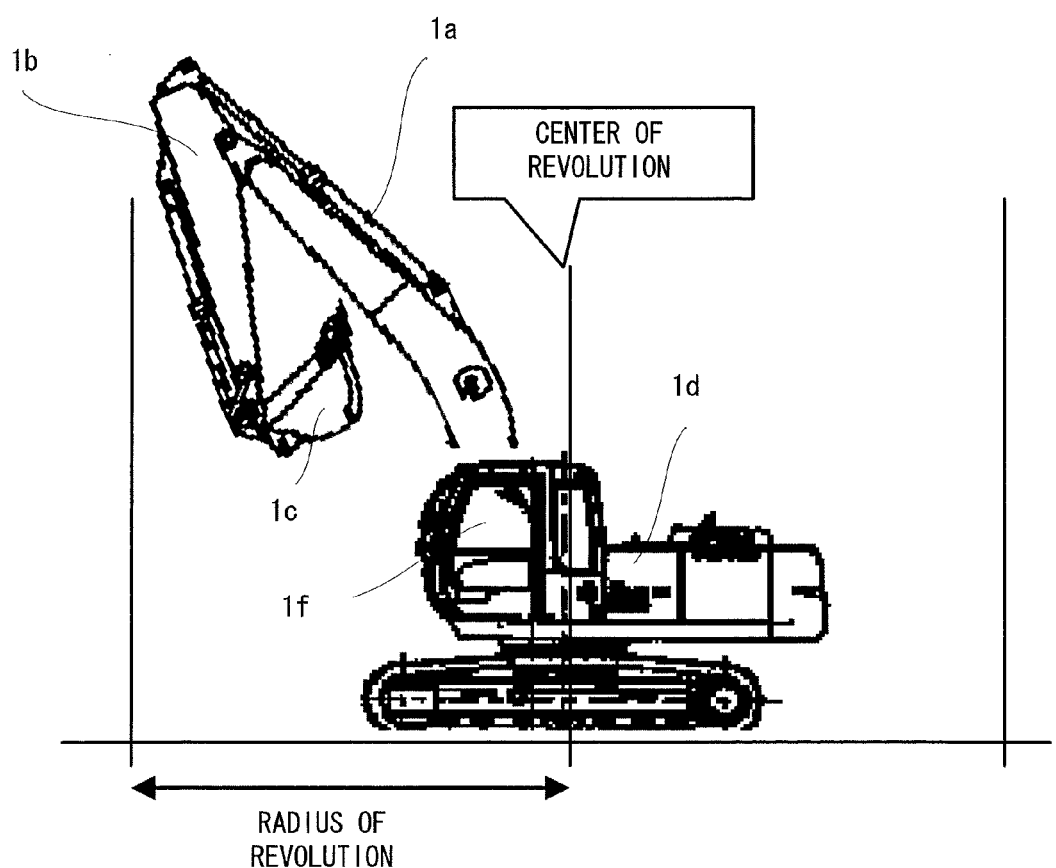

FIG. 5 is a plan view illustrating how a monitoring area around the work machine may be set and FIG. 6 is a side elevation of the work machine in FIG. 5 illustrating the range over which the work machine revolves. The structure of the work machine 1 makes it difficult for the operator in the operator's cab 1f to visually check the range marked as a first area 101. A second area 102 is the area through which the front work unit 1A passes as the work machine 1, assuming a post-excavation attitude, revolves. At the work machine assuming the "post-excavation attitude", the boom 1a is held upright, the arm 1b is folded under the boom 1a and the bucket 1c is bent so that it is positioned between the arm 1b and the boom 1a, as shown in FIG. 6. As the revolving superstructure 1d revolves around an axis set at the center of revolution, the revolving superstructure 1d rotates with a radius of revolution taken over the distance between the front end of the boom 1a at which the arm 1b is attached and the revolution center. In the following description, the position of the front end at which the arm 1b is attached to the boom 1a at this front work unit 1A will be referred to as a "front work unit front-end position".

A third area 103 partially overlaps with both the first area 101 and the second area 102. The third area 103 is set so that it includes an area greater than the second area 102 over the visible range that can be visually checked by the operator in the operator's cab 1f excluding the area where the work machine 1 is engaged in work. In addition, the range that cannot be visually checked with ease by the operator in the operator's cab 1f substantially matches the first area 101.

The first through third areas 101 through 103 are areas set in real space surrounding the work machine, and the second area 102, in particular, is an area corresponding to an immediate area set around the work machine. The conditions in this area 102 are displayed in the form of the bird's eye view image at the display device. The third area 103 corresponds to a warning range set around the work machine, and if a worker enters the third area 103 beyond a boundary 103a, the worker is determined to be approaching the work machine or to be within the warning range. The sensitivity level of each of the wireless receivers 10a, 10b and 10c may be adjusted so that the outer boundary 103a of the third area 103 defines the outer limit at which the signal transmitted from the wireless transmitter 81 located at the boundary 103a can be received at the wireless receivers 10a, 10b and 10c.

FIG. 3 is a block diagram showing an overall system that includes the monitoring device shown in FIG. 1.

The monitoring device includes a body controller 30, a display device 50, a monitoring controller 60, the wireless receivers 10a, 10b and 10c and the cameras 13a, 13b and 13c. The system also includes devices operating as peripheral devices for the monitoring device, such as a management office computer 70, an information terminal 71, an alarm control unit 66, the alarm devices 19a through 19c and the wireless transmitter 81 shown in FIG. 2.

The information terminal 71, which may be, for instance, a notebook-type PC (personal computer), a PDA (personal digital assistant) device or a dedicated portable communication terminal, reads out the most up to date data pertaining to work performed by workers from a worker database in the management office computer 70 on a regular basis, e.g., at the start of each work day. In addition, the latest data read out from the worker database are held in an information holding unit 65 at the monitoring controller 60, to which the data are transmitted through wireless communication or wired communication.

The body controller 30 includes a body control unit 31. The cylinders 3a, 3b and 3c, the revolving motor 3d, the pair of traveling motors 3e and 3f, the operation levers 4a, 4b, 4c, 4d and 4e disposed in the operator's cab 1f, the angle detectors 8a, 8b, 8c and 8d and speed detectors 8e and 8f are connected to the body control unit 31. The speed detectors 8e and 8f, which are not shown in FIG. 1, are mounted at the traveling superstructure 1e so that the rotation rates of the left and right motors 3e and 3f can be individually measured. Based upon signals provided from the speed detectors 8e and 8f, the traveling speed of the work machine and the advancing direction along which the work machine is advancing can be detected.

The body control unit 31 engages the boom 1a, the arm 1b and the bucket 1c in operation by driving the cylinders 3a through 3c in response to operations performed at the operation levers 4a through 4c by the operator in the operator's cab 1f, whereas it engages the revolving superstructure 1d in revolving operation and engages the body in traveling operation by driving motors 3d, 3e and 3f in response to operations performed at the operation levers 4d and 4e by the operator in the operator's cab 1f. Detection information pertaining to the attitudes (angles) of the boom 1a, the arm 1b and the bucket 1c at the work machine 1 and the drive condition (inclining angle) of the revolving superstructure 1d is transmitted to the monitoring controller 60 from the angle detectors 8a through 8d. Detection information pertaining to the body conditions such as the body traveling speed is transmitted from the speed detectors 8e and 8f to the monitoring controller 60.

The monitoring controller 60 comprises an entry decision-making unit 61, a display control unit 62, a camera image processing unit 63 and the information holding unit 65.

Work monitoring area charts and a worker database prepared in advance are held in the information holding unit 65. The work monitoring area charts, each registering an area around the work machine that is designated as an area requiring monitoring, correspond to the first through third areas 101 through 103 set around the work machine 1, as shown in FIG. 5. The work monitoring area charts each include an illustration of a bird's eye view of the work machine 1, as will be described later.

FIG. 4 presents an example of the worker database.

The worker database holds data written in fixed information fields, which are fixed information pertaining to individual workers, and data written in changeable information fields, which are information indicating changes occurring in the statuses of the individual workers as time elapses and work machine condition information indicating the attitude of the body and the drive conditions. The fixed information fields include "ID" (worker identification information), "name" (worker specification information), "work details", "work area" and "update date/time". The data written in "ID" are information assigned to each worker, which enables identification of the particular worker as distinguishable from the other workers. The "ID" information is output from the wireless transmitter 81 carried by each worker. A visitor, too, will carry a wireless transmitter with "ID" information indicating that the carrier is a visitor, registered therein.

The data written in "name" indicates a name, such as a family name, representing the specific identity of each worker. The data written in "work details", indicating types of work performed by workers, are information used to determine how close each worker needs to position himself to the work machine or the work area during work. The data written in "work area" are information indicating specific work areas where the workers have to work. Some workers may need to work over a plurality of work areas, and accordingly, information indicating all the work areas that each worker needs to enter is written in "work area". The data written in "update date/time" indicate the date/time at which the information for each worker has been most recently updated.

The data written in the changeable information fields include "entry status", "entry position" and "entry details", pertaining to each worker that works around the work machine, and "front work unit front-end position" and "traveling speed" provided as work machine condition information indicating the attitude of the work machine, the drive conditions and the like. In the "entry status" field, information indicating whether each worker is currently located inside or outside of the work monitoring area, i.e., inside or outside the third area 103 described in reference to FIG. 5 in this embodiment, is written. For instance, "yes" may be written if the current worker position is inside the work monitoring area, whereas "no" may be written if the worker is currently located outside the work monitoring area. In the "entry position" field, information indicating the worker position, i.e., to the left, to the right or to the rear of the work machine inside the work monitoring area, is written when the "yes" is written for "entry status". Namely, "left", "rear" or "right" indicated in the information written in the "entry position" field corresponds to a specific reception direction among the directions in which the wireless receivers 10*a*, 10*b* and 10*c* receive signals, and also corresponds to a specific direction along which an alarm device among the alarm devices 19*a*, 19*b* and 19*c* is turned and the corresponding camera among the cameras 13*a*, 13*b* and 13*c* is turned.

When "yes" is written in the "entry status" field, either "approaching" or "entered" is written in the "entry details" field in correspondence to the relationship between the position of the particular worker working around the work machine and the monitoring area. When "no" is written in the "entry status" field, either "approaching" or "no entry" is written in the "entry details" field in correspondence to the position of the particular worker working around the work machine and the monitoring area. When either "approaching" or "entered" is written in the "entry details" field, either "extending" or "contracting" is written in the "front work unit front-end position" in correspondence to the drive condition of the front work unit 1A. When "yes" is written in the "entry status" field, either "high" or "low" is written in the "traveling speed" field. The information recorded in the "entry details", "front work unit front-end position" and "traveling speed" fields will be described in further detail later in reference to the flow of processing.

The entry decision-making unit 61, which includes an entry judgment unit (not shown), monitors reception conditions at the wireless receivers 10*a* through 10*c* at all times. As a signal transmitted from the wireless transmitter 81 is received at any of the wireless receivers 10*a* through 10*c* or as a wireless transmitter 81 is judged to be located within the work monitoring area, the entry decision-making unit 61 references the worker database held in the information holding unit 65 based upon the "ID" information originating from the wireless transmitter 81. Then, the entry decision-making unit 61 writes the relevant information in the "entry status" field and the "entry position" field for the particular worker corresponding to the "ID" information as explained earlier.

The camera image processing unit 63, which includes an image conversion unit, takes in images captured by the cameras 13*a*, 13*b* and 13*c*. The image conversion unit converts the images thus taken into bird's eye view images, i.e., views of the area around the work machine 1 from above, and creates a composite image by combining the images having originated from the cameras 13*a* through 13*c* and having been converted to bird's eye view images. This composite image is transmitted to the display control unit 62.

The surrounding area monitoring device according to the present invention provides information indicating the conditions around the work machine in the form of a bird's eye view image centered on the work machine and displayed at the display device. In other words, the composite image described above is a bird's eye view image of the monitoring target area set around the work machine, taken from above the work machine. The surrounding area monitoring device according to the present invention selectively brings up on display at the display device an immediate range display image showing the conditions in an immediate area in real space, set over an immediate range around the work machine, or a wide range display image showing the conditions in a wide area set in real space so as to include the immediate area. The immediate range display image includes a graphic schematic of the work machine and a bird's eye view image of an area over a predetermined range surrounding the work machine, taken from directly above the work machine. The bird's eye view image is set around the schematic graphic image of the work machine. The bird's eye view image is a synthetic live-view image. The wide range display image includes an image obtained by reducing the immediate range display image, i.e., the bird's eye view image, and an image showing the conditions in a wide area set so as to achieve a predetermined width beyond the immediate area, in a schematic graphic representation.

It is to be noted that the conditions in the third area 103 in FIG. 5 can be monitored by checking the wide range display image.

The display control unit 62 generates a monitor image based upon body information 39 provided by the body controller 30, the work monitoring area charts and the information recorded in the various fields in the worker database, both held at the information holding unit 65, and the composite bird's eye view image providing work machine surrounding area information, transmitted from the camera image processing unit 63, and outputs the monitor image to the display device 50 so that it is brought up on display at the display device 50. The monitor image displayed at the surrounding area monitoring device in the embodiment is either of the immediate range display image and the wide range display image described above.

The display device 50 includes a display unit 51, an alarm unit 52, an input unit 53 and a sound pick-up unit 54. The display unit 51 brings up on display the monitor image having been created by the display control unit 62. The alarm unit 52 outputs an alarm sound. The sound pick-up unit 54 is equipped with a transmitter that includes microphones through which sound is transmitted to the individual alarm devices 19*a*, 19*b* and 19*c* and an amplifier. The transmitter is equipped with three microphones, each corresponding to one of the alarm devices 19*a*, 19*b* and 19*c*. Sound input to a given microphone is transmitted to the alarm control unit 66 and is output via the corresponding alarm device among the alarm devices 19*a*, 19*b* and 19*c*. The input unit 53 outputs, a signal used to switch, via the display control unit 62, the display image currently on display at the display unit 51 to another display image. Such an input unit 53 may be configured as a touch panel mounted on the display unit 51. As the operator touches a key input portion in a display screen among various display screens such as those shown in FIGS. 7 through 9, which include key input portions 114 through 116, 118, 134, 135 and the like, the corresponding input signal is provided to the display control unit 62 and specific control is executed accordingly, as will be described in detail later.

The information recorded in the various changeable information fields in the worker database held in the information holding unit 65 is updated as follows. The display control unit 62 updates the "entry details" information as the entry status of a worker working around the work machine 1 changes. The information recorded in the "entry details" field indicates one of the three statuses, "no entry", "approaching" and "entered", as shown in FIG. 13. It is to be noted that a warning range 113, a first alarm range 112*a* and a second alarm range 112*b*, to be mentioned next, will be described in detail later. In the update example presented in the first row in FIG. 13, the current status "no entry" is updated to "approaching", as indicated in the "next status" once the worker "enters the warning range 113", set as a "trigger condition". If the worker "approaching", as indicated in the "current status", has "entered" the first warning range 112*a*" set as a "trigger condition", his status is updated to "entered", as indicated in the "next status" (fourth row). If the worker, having "entered" an alarm range, as indicated in the "current status", has then "exited the second alarm range 112*b* into the warning range 113" set as a "trigger condition", his status is updated to "approaching", as indicated in the "next status" (fifth row).

The front work unit front-end position information is updated as shown in FIG. 14. If the front end of the front work unit, the "current status" of which is "extending", has "entered the first alarm range 112a" set as a "trigger condition", the front work unit front-end position information is updated to "contracting", as indicated in the "next status", since the front work unit has been driven along the direction in which the arm 1b becomes folded under such circumstances. If, on the other hand, the front end of the front work unit, the "current status" of which is "contracting", has "exited the second alarm range 112b into the warning range 113" set as a "trigger condition", the front work unit front-end position information is updated to "extending", as indicated in the "next status", since the front work unit has been driven so as to open the arm 1b under such circumstances.

The traveling speed information is updated as shown in FIG. 15. If a "traveling lever operation", set as a "trigger condition", is detected while the "current status" for the traveling speed is "stationary", the traveling speed information is updated to "low" as indicated in the "next status". If "no traveling lever operation", set as a "trigger condition" is detected while the "current status" of the traveling speed is "low", the traveling speed information is updated to "stationary", as indicated in the "next status". If "5 km/h or higher", set as a "trigger condition", is detected while the "current status" of the traveling speed is "low", the traveling speed information is updated to "high", as indicated in the "next status". If "4 km/h or lower", set as a "trigger condition", is detected while the "current status" of the traveling speed is "high", the traveling speed information is updated to "low", as indicated in the "next status".

Figure 7:
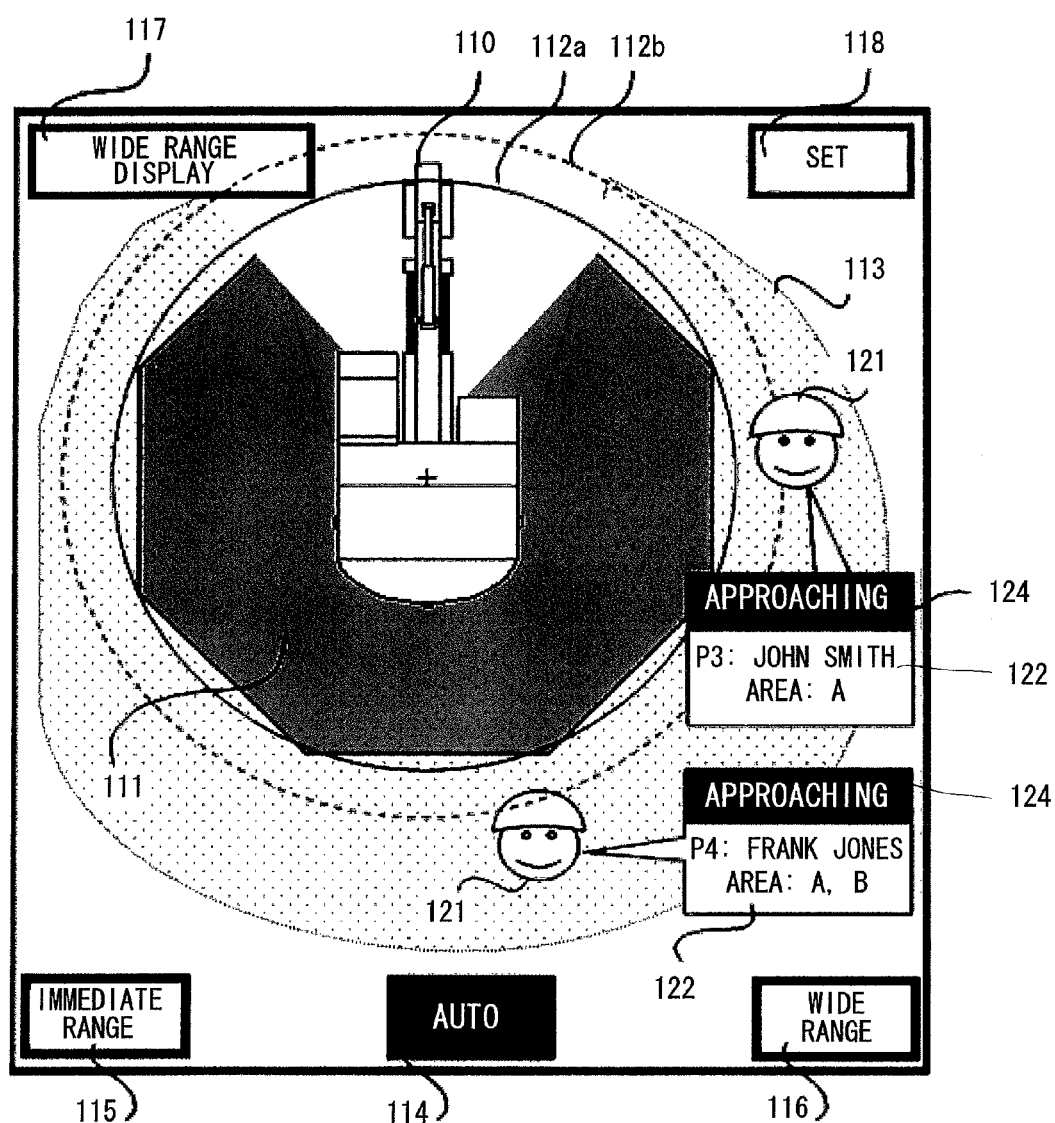
Figure 8:
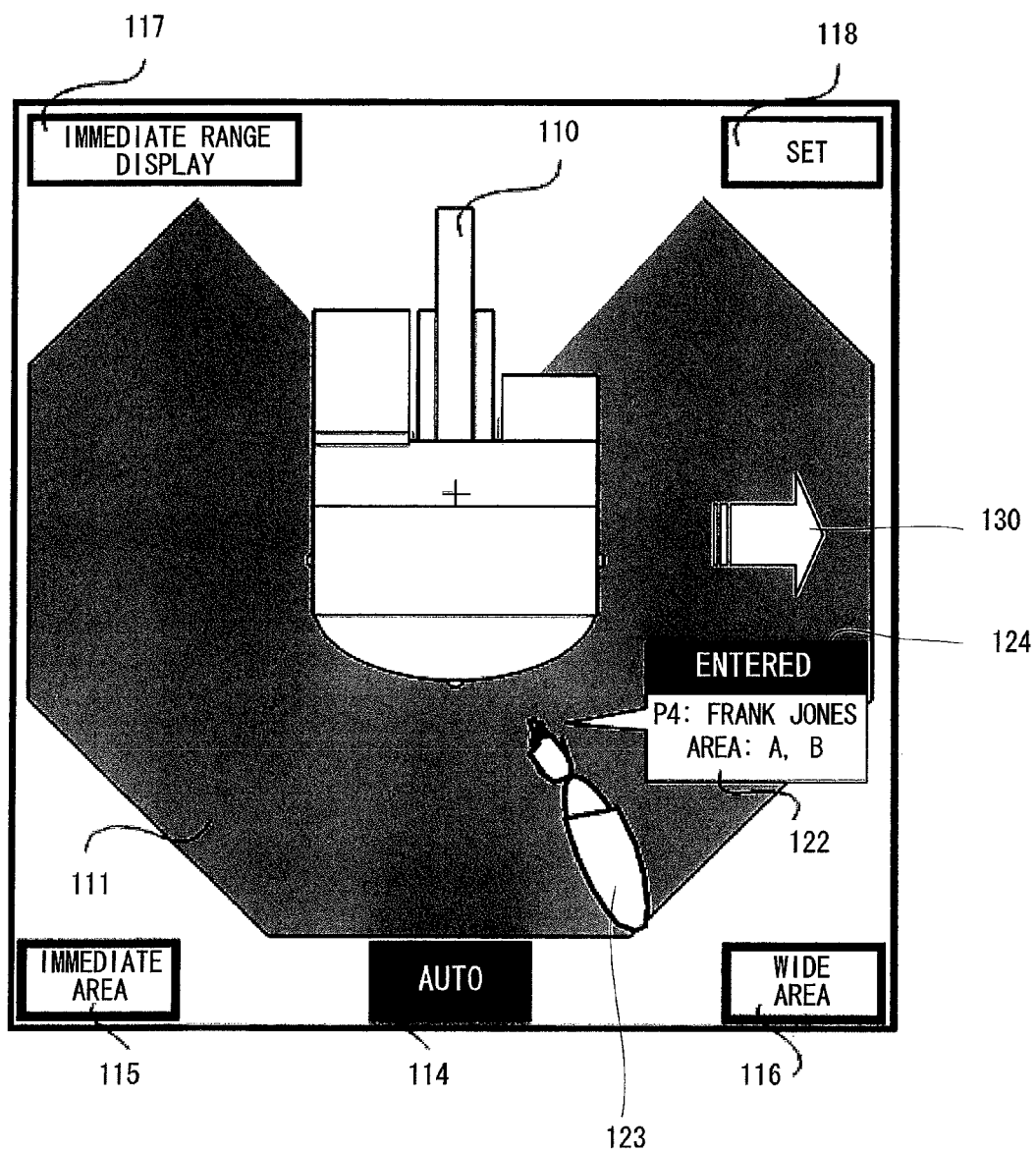

In reference to FIGS. 7 and 8, examples of monitor images generated by the display control unit 62 are described.

The display control unit 62 in this embodiment generates two different images, i.e., a wide area monitor image shown in FIG. 7 and an immediate area monitor image shown in FIG. 8. The wide area monitor image is the wide range display image mentioned earlier, whereas the immediate area monitor image is the immediate range display image described earlier.

The wide area monitor image (wide range display image) in FIG. 7 is made up with a surrounding image area 111 over which a bird's eye view image provided from the camera image processing unit 63 is drawn, a boundary line 112a defining the first alarm range, a boundary line 112b defining the second alarm range, a boundary line 113 defining the warning range, worker marks 121, marking worker positions, which are generated each in correspondence to a worker currently located in close proximity to the work machine based upon the information output from the information holding unit 65, worker information 122 pertaining to the workers currently located near the work machine, such as the worker specification information and the work area information, and entry details information 124 providing details regarding entry statuses of the workers.

In the following description, reference numeral 111 is also appended to the bird's eye view image, drawn within the surrounding image area 111, for purposes of simplification. In addition, reference numeral 112a is appended to the image within the first alarm range defined by the boundary line 112a and reference numeral 112b is appended to the image within the second alarm range defined by the boundary line 112b.

The first alarm range 112a, set based upon the revolving range of the front end portion of the arm 1b of the front work unit 1A, substantially matches the second area 102 in FIG. 5. The first alarm range 112a is a range defined within the display screen, whereas the second area 102 is an area defined in the real space that needs to be monitored around the work machine. The second area 102 defined in real space corresponds to the surrounding image area 111 defined within the display screen in the embodiment. Accordingly, the conditions in the area within the revolving locus of the front end of the front work unit while the front work unit 1A assumes a specific attitude are displayed in the bird's eye view image.

The second alarm range 112b ranges beyond the first alarm range 112a over a width matching the arm span of an average worker.

The warning range 113, over which the wireless receivers 10a through 10c are able to monitor worker movements to determine whether or not any worker has moved close to the work machine, substantially corresponds to the third area 103 in FIG. 5. Namely, the warning range 113 is a range defined within the display screen, whereas the third area 103 is an area where access statuses of workers with respect to the work machine are monitored in the real space that needs to be monitored around the work machine.

The immediate area monitor image (immediate range display image) shown in FIG. 8 is made up with an external view illustration 110 providing a bird's eye view of the work machine 1, the surrounding image area 111 where the bird's eye view image is drawn, provided from the camera image processing unit 63, a bird's eye view worker image 123 of a worker within the bird's eye view image, provided from the camera image processing unit 63, worker information 122 pertaining to any worker currently located near the work machine, such as the worker specification information and the work area information, entry details information 124 providing details regarding entry statuses of the workers and an approaching mark 130.

In the immediate area monitor image shown in FIG. 8, the surrounding image area 111 in the wide area monitor image in FIG. 7 is displayed as an enlarged image filling the entire display screen. In the surrounding image area 111 in FIG. 8, the conditions in the second area 102, the images of which are captured via the cameras 13a, 13b and 13c are displayed in the form of a composite bird's eye view image generated at the camera image processing unit 63. Any worker or any other work machine or equipment present in the second area 102 set in the real space around the work machine is displayed as a bird's eye view image as well. In other words the image showing a worker having entered the second area 102 is a worker image 123, which is a bird's eye view image of the worker captured via the cameras 13a, 13b or 13c, rather than a worker mark 121 provided from the image holding unit 65. In addition, the approaching mark 130 is displayed within the surrounding image area 111 for any worker that is located outside the second area 102 set within the real space surrounding the work machine but is currently located within an alert-prompting area, e.g., the worker with a worker ID P3 in FIG. 7. In other words, the approaching mark 130 is displayed in the surrounding image area 111, for a worker located in a part of the third area 103, set within real space surrounding the work machine, that does not overlap the second area 102.

While the wide area monitor image in FIG. 7 is up, "wide range display" is displayed in a title display portion 117 at the upper left corner of the screen. While the immediate area monitor image in FIG. 8 is up, "immediate range display" is displayed in the title display portion 117 at the upper left corner of the screen. The wide range display may be switched to the immediate range display and vice versa either in an auto mode or in a manual mode. In the auto mode, the display control unit 62 automatically determines the optimal display mode in correspondence to the worker "entry status" information, the "front work unit front-end position" information and the "traveling speed" information. In the manual mode, the operator switches from the wide range display to the immediate range display or vice versa.

The key input portions 114, 115, 116 and 118 are displayed in addition to the title display portion 117 in each monitor image screen. The key input portions 114, 115, 116 and 118 are displayed each in correspondence to a touch key at the input unit 53, and as any of these portions is touched, a key signal is input. In the auto mode, "auto" is displayed with white letters against a black background, as shown in FIGS. 7 and 8, at the key input portion 114 located at the center on the bottom side of the monitor image. In the manual mode, "auto" is displayed with black letters against a white background at the key input portion 114 located at the center on the bottom side of the monitor image. If the manual mode and the immediate range display have been selected, "immediate area" is displayed with white letters against a black background at the key input portion 115 located at the lower left corner of the monitor image, but otherwise "immediate area" is displayed with black letters against a white background. If the manual mode and the wide range display have been selected, "wide range" is displayed with white letters against a black background at the key input portion 116 located at the lower right corner of the monitor image, but otherwise "wide range" is displayed with black letters against a white background.

"Set" is displayed at the key input portion 118 located at the upper right corner of the monitor image. This key input portion 118 is touched when determining details of decision-making rules in the auto mode. As the key input portion 118 is touched in either of the monitor images shown in FIGS. 7 and 8, the display is switched to the screen shown in FIG. 9. In the title display portion 117 in the screen shown in FIG. 9, "Set decision-making rules" is displayed. Display portions 131, 132 and 133 are displayed so as to enable selection of decision-making rules in correspondence to the criteria "worker entry", "front work unit front-end position" and "traveling speed" respectively. Each decision-making criterion is selected by touching the corresponding key input portion 134 where "valid" is displayed. If a given decision-making criterion is not to be selected, the corresponding key input portion 135 where "invalid" is displayed is touched. The key input portion 134 or 135 that has been touched is displayed with white letters against a black background, whereas the key input portion 134 or 135 that has not been touched is displayed with black letters against a white background.

Figure 10:
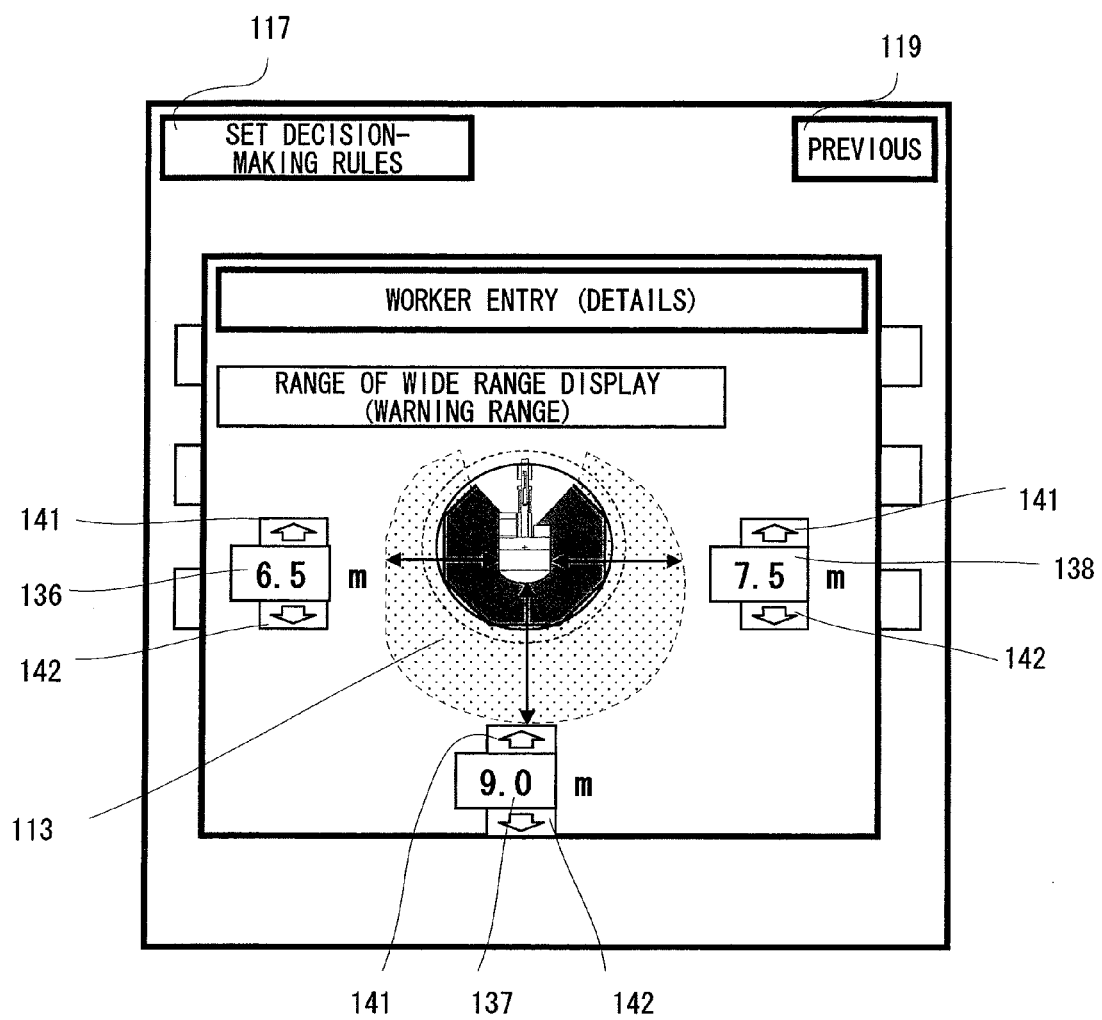
Figure 11:
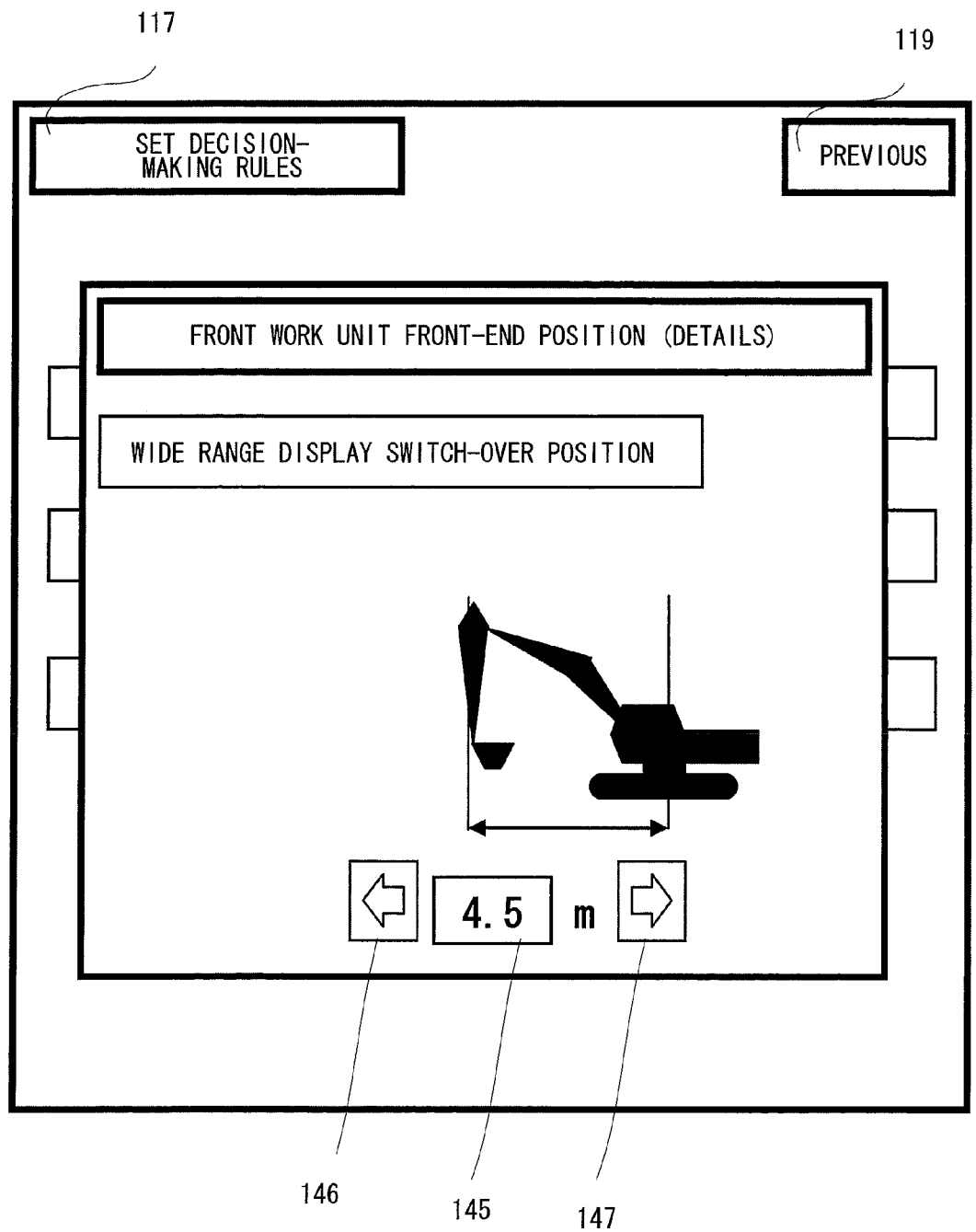
FIG. 11 A display image brought up on display at the display device to allow the operator, having selected "front work unit front-end position" displayed in the display image in FIG. 9, to set decision-making rules for the criterion "front work unit front-end position"
Figure 12:
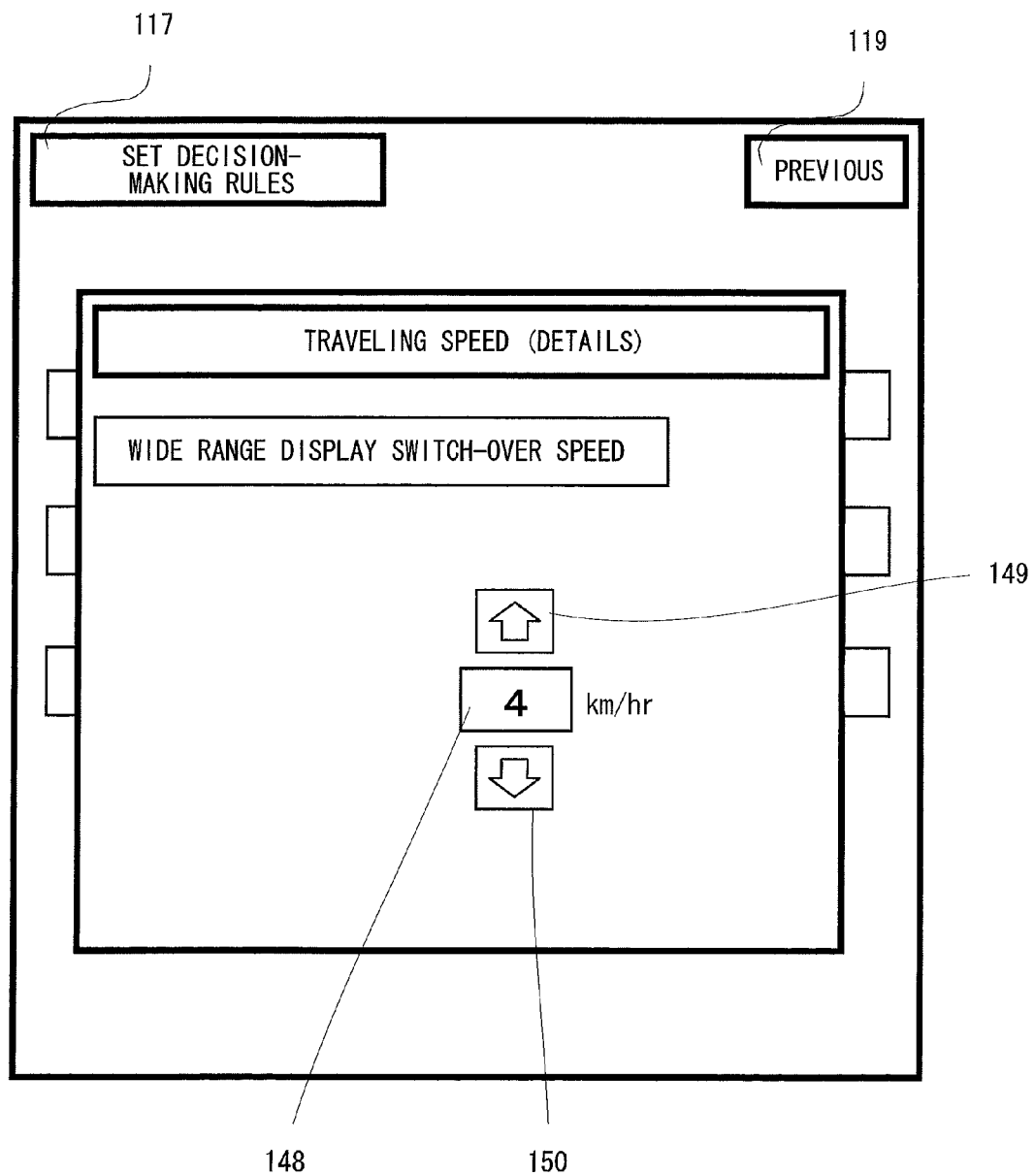
FIG. 12 A display image brought up on display at the display device to allow the operator, having selected "traveling speed" displayed in the display image in FIG. 9, to set decision-making rules for the criterion "traveling speed"

FIGS. 10, 11 and 12 show screens via which decision-making rules are selected in correspondence to the criteria "worker entry", "front work unit front-end position" and "traveling speed" respectively. In the screen shown in FIG. 10, which enables selection of detailed decision-making rules for the criterion "worker entry", the monitoring range for the wide area can be adjusted. In this screen, the wide area monitoring range, initially defined in correspondence to specific default values, can be altered by adjusting the third area 103 (the warning range 113 within the display screen) designated as the reference area for the reception range of the wireless receivers 10a through 10c. The monitoring target range located on the left side of the work machine 1, which is defined by the third area 103, i.e., the warning range 113 within the display screen, directly faces the operator's cab 1f and is thus easy to monitor. Accordingly, a relatively small numerical value, e.g., "6.5" m is set as the initial value in a corresponding range display portion 136. The monitoring target range located on the right side of the work machine 1, which is defined by the third area 103, i.e., the warning range 113 within the display screen, is situated on the opposite side from the operator's cab 1f and is thus not easy to monitor. Accordingly, a numerical value greater than the initial value set in the range display portion 136, e.g., "7.5" m, is set as the initial value in a corresponding range display portion 138. The monitoring target range located to the rear of the work machine 1, which is defined by the third area 103, i.e., the warning range 113 within the display screen, is further rearward relative to where the operator in the operator's cab if is located and is thus very difficult to monitor. Accordingly, the maximum numerical value, e.g., "9.0" m, is set for the initial value in a corresponding range display unit 137. The initial values set in the range display portions 136 through 138 can each be gradually increased or decreased by holding down a "↑" key 141 or a "↓" key 142 so as to adjust the corresponding monitoring range.

The operator is able to alter a switch-over value for the front work unit front-end position, at which the display is to be switched to the wide range display from the default value, in a decision-making rule setting screen for the criterion "front work unit front-end position" shown in FIG. 11. While different front work unit front-end positions are assumed for different types of work machines 1 in different sizes, "4.5" m may be set as the initial value. The operator is able to adjust the distance between the rotational center of the revolving superstructure 1d and the front work unit front-end position by holding down a "←" key 146 or a "→" key 147 in a range display portion 145 so as to gradually increase or decrease the numerical value.

The operator is able to alter a switch-over value for the traveling speed, at which the display is to be switched to the wide range display from the default value, in a decision-making rule setting screen for the criterion "traveling speed" shown in FIG. 12. "4" km/hr, which is the walking speed of an average person, is set in a speed display portion 148 as the initial value for the traveling speed at which the display is to be switched to the wide range display. The operator is able to adjust the display switch-over speed by holding down a "↑" key 149 or a "↓" key 150 in the speed display portion 148 so as to gradually increase or decrease the numerical value.

It is to be noted that a key input portion 119 with "previous" displayed thereat, located in the upper right corner in FIGS. 9 through 12, is a touch key that is touched when the operator wishes to go back to the previous screen.

The following is a description of operations executed in relation to the surrounding area monitoring device for monitoring an area around a work machine achieved in the embodiment as described above.

Figure 16:
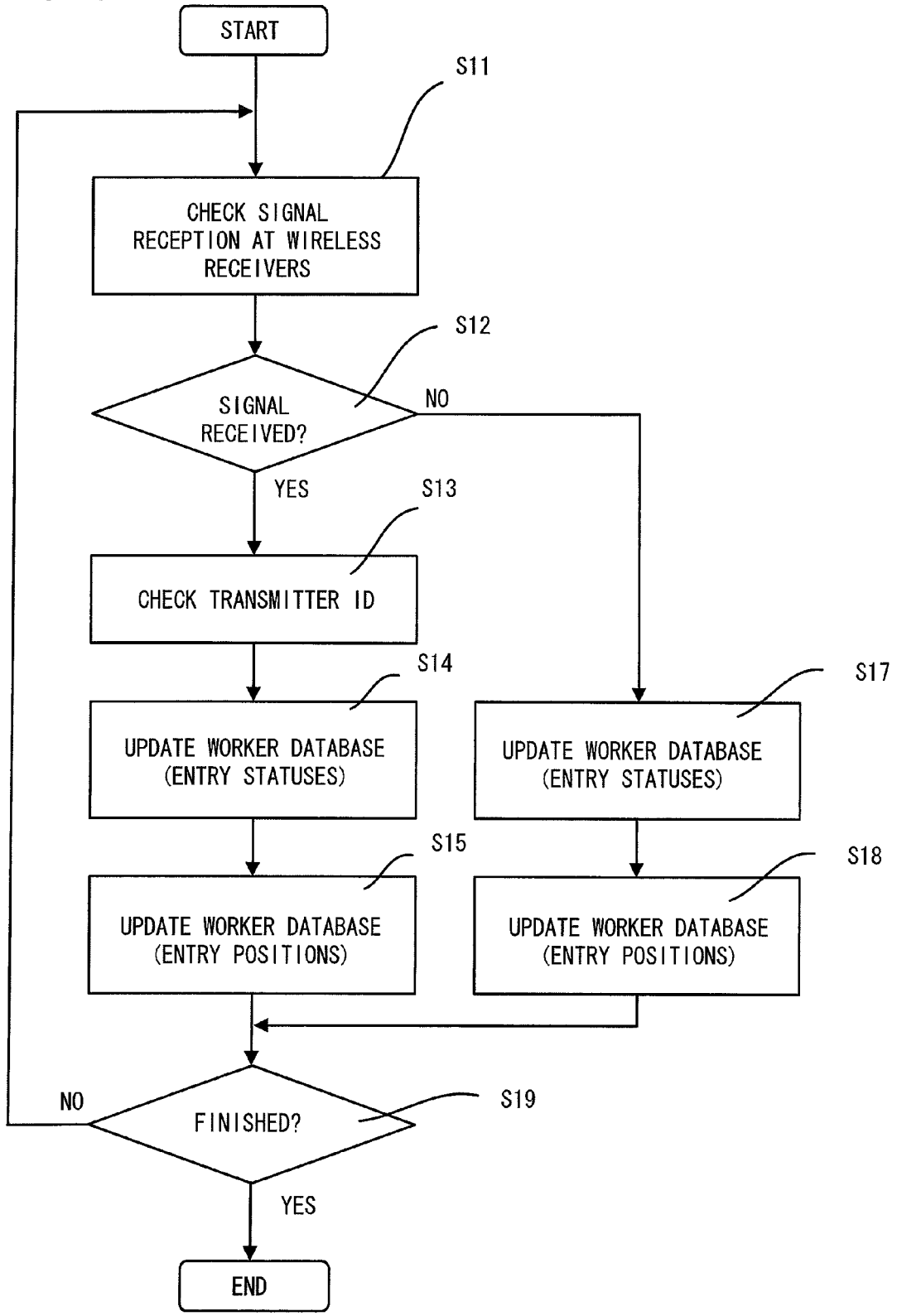

FIG. 16 presents a flowchart of worker entry decision-making processing executed by the entry decision-making unit 61.

This processing, executed in conjunction with the individual wireless receivers 10a through 10c, is started up over predetermined cycles while the work machine 1 is engaged in operation.

Once the entry decision-making processing is started up by the monitoring controller 60, the entry decision-making unit 61 constantly polls for any input from the wireless receivers 10a, 10b and 10c (step S11) and makes a decision as to whether or not any signal has been received (step S12). If it is decided that a signal has been received, the operation proceeds to execute the processing in step S13, whereas if no signal has been received, the operation proceeds to execute the processing in step S17. If a signal has been received, i.e., if a worker has entered the third area 103 defined within real space surrounding the work machine, the "ID" assigned to the particular worker is obtained in step S13 through an "ID" check of the signal received from the wireless transmitter 81 carried by the worker.

Next, based upon the "ID" thus obtained, the worker database held in the information holding unit 65 is referenced and the "entry status" corresponding to the particular "ID" is updated to "yes". In addition, the "entry status" information corresponding to "IDs" other than the "ID" having been obtained is updated to "no" (step S14). Then, based upon the input signal reception levels at the wireless receivers 10*a*, 10*b* and 10*c*, "left", "right" or "rear" is written in the "entry position" field corresponding to the "ID" of the worker whose "entry status" has been updated to "yes" by referencing the worker database held in the information holding unit 65.

If it is decided in step S12 that no signal has been received, the worker database held in the information holding unit 65 is referenced and the "entry status" information corresponding to all the "IDs" is updated to "no" in step S17. Next, in step S18, any information having been previously recorded in the "entry position" field is cleared by referencing the worker database held in the information holding unit 65. This processing is repeatedly executed through the duration of the surrounding area monitoring period, and once an end signal originating from the monitoring controller 60 is detected (step S19), the flow of the entry decision-making processing ends.

Figure 17:
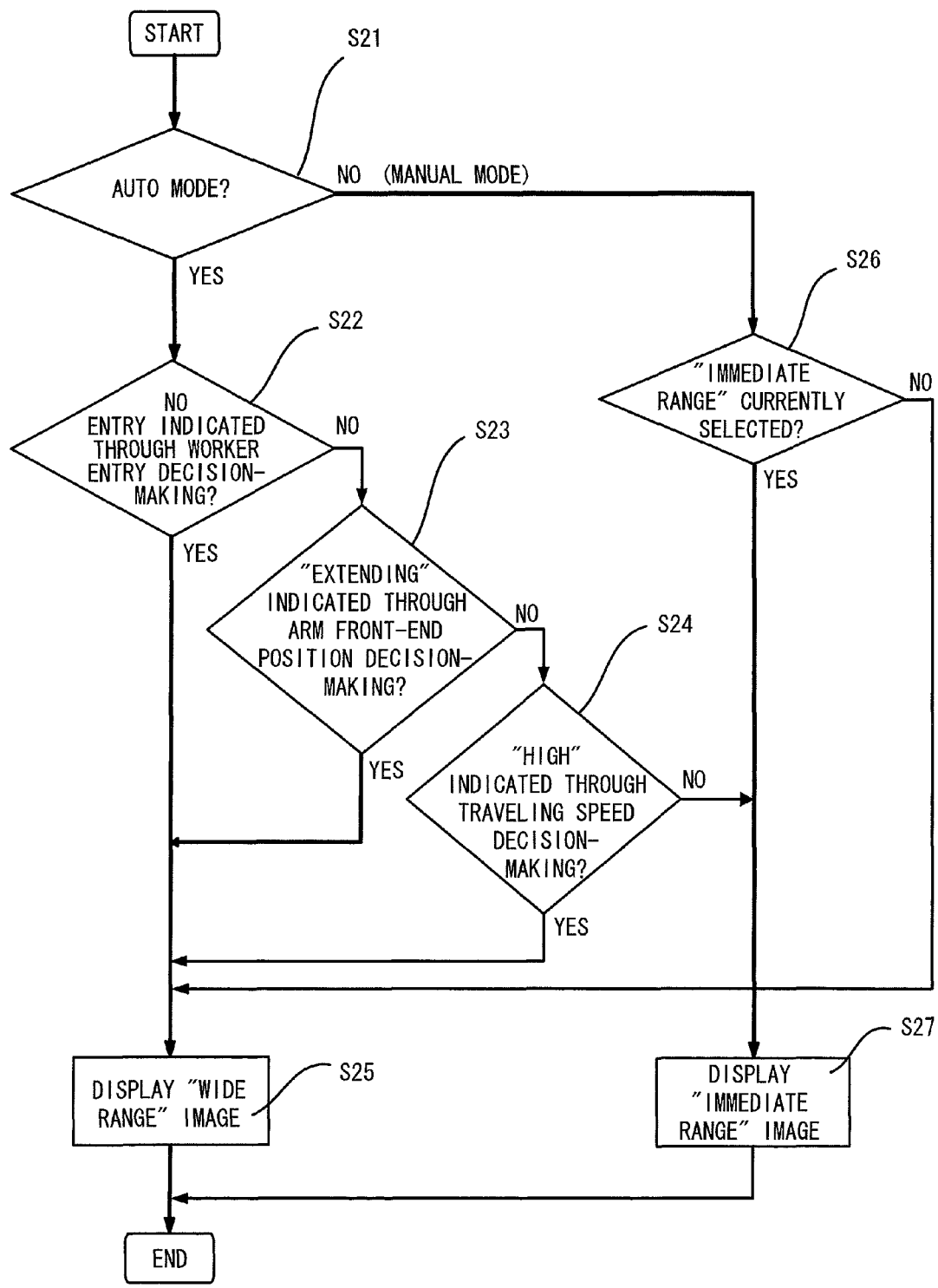

Next, in reference to the flowchart presented in FIG. 17, the display range selection processing executed in the display control unit 62 is described. This processing is started up over predetermined cycles while the work machine is engaged in operation.

In step S21, a decision is made as to whether the auto mode or the manual mode is currently set for display range selection. The operator is able to select either the auto mode or the manual mode by touching the key input portion 114 shown in FIG. 7 and FIG. 8. If the auto mode is currently set, the processing in step S22 is executed, whereas if the manual mode is currently set, the processing in step S26 is executed.

In the auto mode, a decision is made in step S22 as to whether or not any worker has entered an area near the work machine. In other words, a decision is made as to whether or not any worker is present within the third area 103 (the warning range 113 in the display screen) defined in the real space around the work machine. If all the information in the "entry details" field in the worker database (see FIG. 4) held in the information holding unit 65 indicates "no entry", i.e., if no worker is present within the warning range 113 in the display screen, the operation proceeds to execute the processing in step S25. If any information in the "entry details" field indicates either "approaching" or "entered", i.e., if there is a worker present within the warning range 113, the operation proceeds to execute the processing in step S23. In step S23, a decision is made with regard to the arm front-end position. This decision can be made by determining whether or not the "front work unit front-end position" information in FIG. 4 indicates "extending". The operation proceeds to execute the processing in step S25 if the information in the "front work unit front-end position" indicates "extending", whereas the operation proceeds to execute the processing in step S24 if the information indicates "contracting".

If it is decided in step S23 that the "front work unit front-end position" information indicates "contracting", a decision is made in step S24 with regard to the "traveling speed". This decision can be made by determining whether or not the "traveling speed" information in FIG. 4 indicates "high". The operation proceeds to execute the processing in step S25 if the "traveling speed" information is determined to indicate a "high" in step S24, whereas the operation proceeds to execute the processing in step S27 if the information is determined to indicate "low" or "stationary". In step S25, a wide area monitor image is created as the monitor image used to monitor an area surrounding the work machine 1.

If it is decided in step S21 that the manual mode is currently set, a decision is made in step S26 as to whether the wide range display shown in FIG. 7 or the immediate range display shown in FIG. 8 is currently selected. If it is decided that the currently selected display setting is the wide range display, the operation proceeds to execute the processing in step S25. If, on the other hand, it is decided that the currently selected display setting is the immediate range display, the operation proceeds to execute the processing in step S27. In step S27, an immediate area monitor image is created as the monitor image used to monitor an area surrounding the work machine 1. Once the processing in step S25 or step S27 is completed, the processing flow ends.

Figure 18:
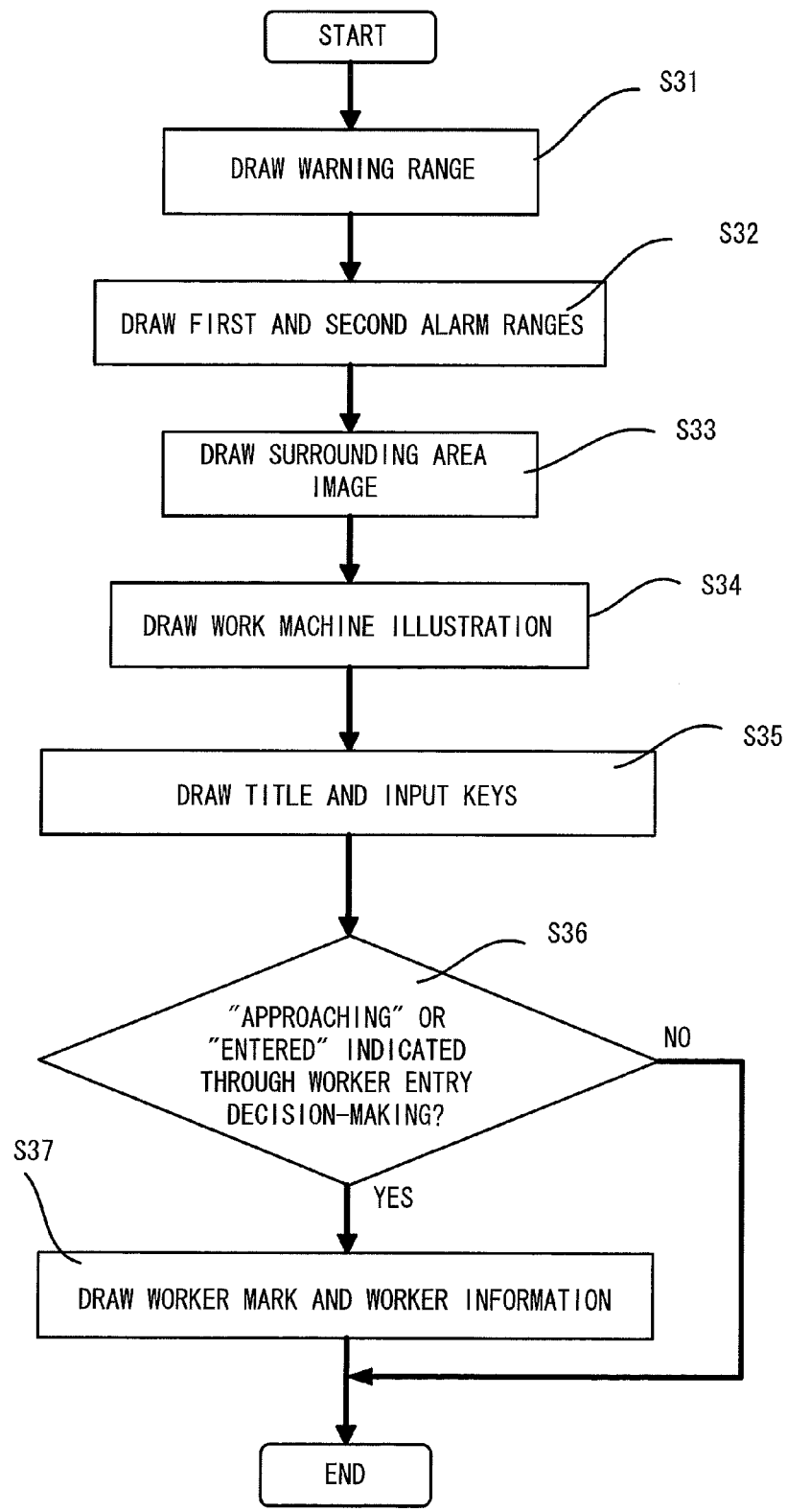

Next, the wide area monitor image generation processing executed in the display control unit 62 is described in reference to the flowchart presented in FIG. 18. This processing is started up in continuation from the display range selection processing executed in the display control unit 62, as shown in FIG. 17.

First, in step S31, the warning range 113 shown in FIG. 7 is drawn. Next, in step S32, the first alarm range 112*a* and the second alarm range 112*b* shown in FIG. 7 are drawn. Then, in step S33, the surrounding image area 111 is drawn. As described earlier, the surrounding image area 111 is a bird's eye view image of the conditions surrounding the work machine 1, taken from above the work machine. In the following step S34, the external view illustration of the work machine 1, the data for which are held in the information holding unit 65, is drawn.

Once the external view illustration is drawn, the title and input keys are drawn in step S35. Then, in step S36, a decision is made as to whether or not the "entry details" information for any worker indicates "approaching" or "entered". If it is decided that the "entry details" information for a worker indicates "approaching" or "entered", the operation proceeds to execute the processing in step S37. However, if the "entry details" information for all the workers indicates "no entry", the processing ends. In step S37, the information entered in the "ID" field, the "name (worker specification information)" field, the "work area" field and the "entry position" field for the particular worker is obtained from the worker database. Then, a worker mark 121 is appended to the "name" and the "work area" having been obtained from the worker database and an image of the worker mark 120 appended to the "name" and the "work area" is drawn and displayed at the screen display position corresponding to the "entry position".

The images drawn in steps S31 through S35 and step S37 are combined and, as a result, a wide area monitor image such as that shown in FIG. 7, is created.

It is to be noted that the processing in steps S36 and S37 is executed for all the workers whose "entry status" information in the worker database indicates "yes".

Figure 19:
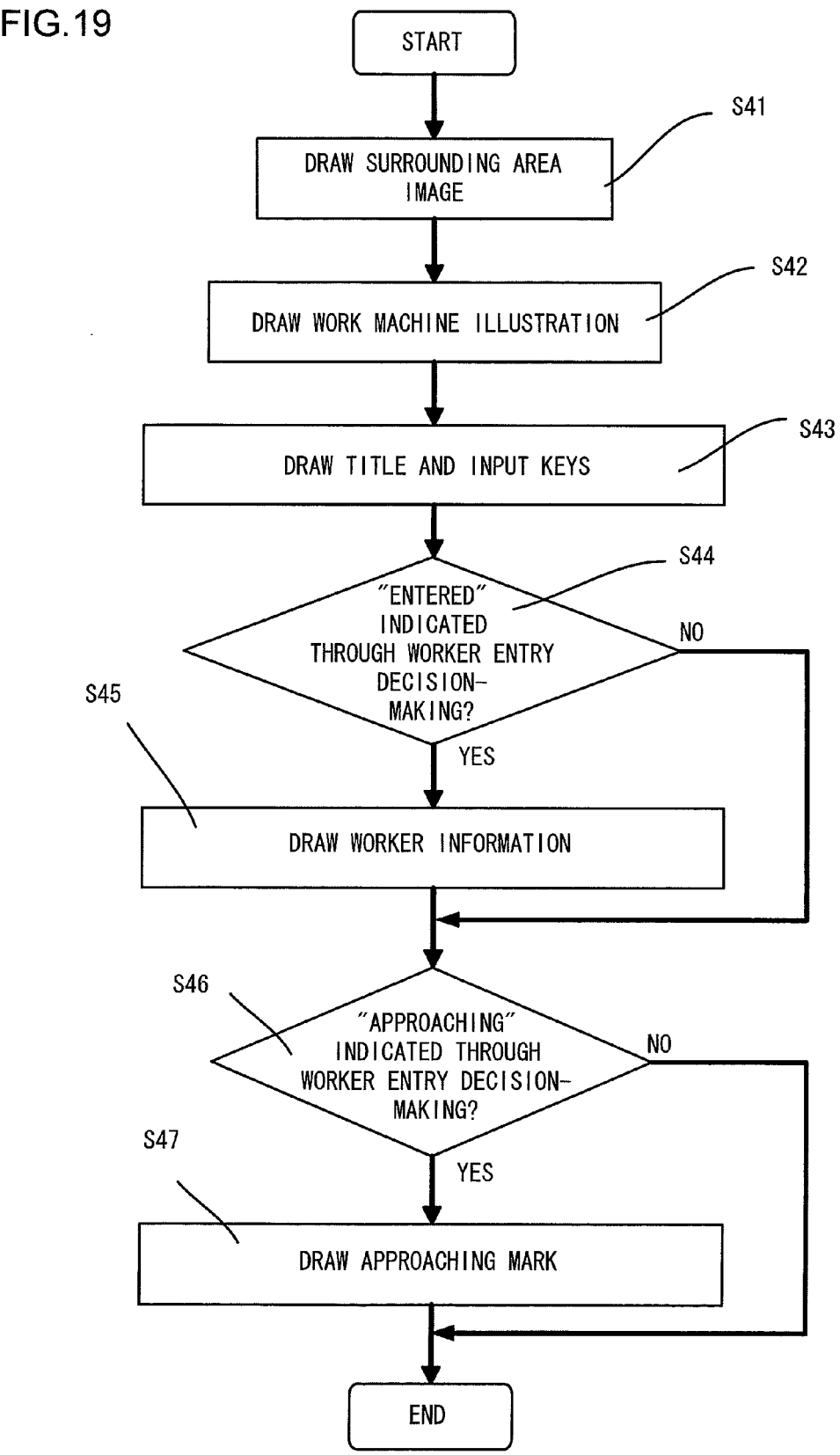

Next, the immediate area monitor image generation processing executed in the display control unit 62 is described in reference to the flowchart presented in FIG. 19. This processing is started up in continuation from the display range selection processing executed in the display control unit 62, as shown in FIG. 17.

First, in step S41, the camera image processing unit 63 draws the surrounding image area 111 obtained as a bird's eye view image converted from an image of an area surrounding the work machine 1. If there is any worker, other work machine or equipment present in the surrounding area, a bird's eye view image of the worker, the other work machine or equipment, too, will be displayed.

In the following step S42, the external view illustration of the work machine 1, the data for which are held in the information holding unit 65, is drawn. Then, the title and input keys are drawn in step S43. Then, in step S44, a decision is made as to whether or not the "entry details" information for any worker indicates "entered". If it is decided that the "entry details" information for a worker indicates "entered", the operation proceeds to execute the processing in step S45. However, if the "entry details" information for any worker does not indicate "entered", the operation skips the processing in steps S45 and jumps to step S46. In step S45, the information entered in the "ID" field, the "name (worker specification information)" field, the "work area" field and the "entry position" field for the particular worker is obtained from the worker database. Then, the "name", the "work area", the worker information 122 and the entry detail information 124, having been obtained from the worker database, are drawn so as to be displayed near the screen display position at which the corresponding worker image is displayed.

Upon completing the processing in steps S45, a decision is made in step S46 as to whether or not the "entry details" information for any worker indicates "approaching". If "approaching" is not indicated in the "entry details" information for any worker, the processing flow ends. If, on the other hand, the "entry details" information for a worker indicates "approaching", an approaching mark 130 is drawn in step S47, before ending the processing flow. The approaching mark 130 is drawn so as to be displayed at the corresponding position in the warning area.

The images drawn in steps S41 through S43, step S45 and step S47 are combined and, as a result, an immediate area monitor image, such as that shown in FIG. 8, is created.

It is to be noted that the processing in steps S44 through S47 is executed for all the workers whose "entry status" information in the worker database indicates "yes".

The data entered for "ID=P4" in FIG. 4 represent an example of conditions under which the wide area monitor image is selected, whereas the data entered for "ID=P5" in FIG. 4 represent an example of conditions under which the immediate area monitor image is selected.

In the embodiment described above, either the wide area monitor image or the immediate area monitor image is selected in correspondence to details of information entered in the "entry details" field. In the wide area monitor image, the positional relationship between the work machine and a worker working in an area around the work machine can be ascertained with ease. In addition, the wide area monitor image allows the positional relationship between the work machine and a plurality of workers or obstacles to be ascertained in an overall view, and in particular, enables the operator to keep track of the movement of each worker or another work machine, such as the direction along which the worker or the work machine is moving, the speed at which the worker or the work machine is moving and the like, as well. If a person is detected to be approaching the area surrounding the work machine or to have entered the area surrounding the work machine, the display setting is switched to the immediate area monitor image display, which will be provided as an enlarged display and will thus tend to eliminate human error that might otherwise be committed by the monitoring operator. Furthermore, before switching to the immediate area monitor image, the operator is able to predict likely impending conditions in the wide area monitor image and thus, is able to monitor the area surrounding the work machine to ensure maximum safety without lowering work efficiency.

In addition, the optimal monitor image, i.e., either the wide area monitor image or the immediate area monitor image, is selected in correspondence to the "front work unit front-end position" and the "traveling speed". As a result, the onus on the operator operating the work machine is reduced, better work efficiency is assured and even better monitoring safety is achieved.

(Variations)

Figure 9:
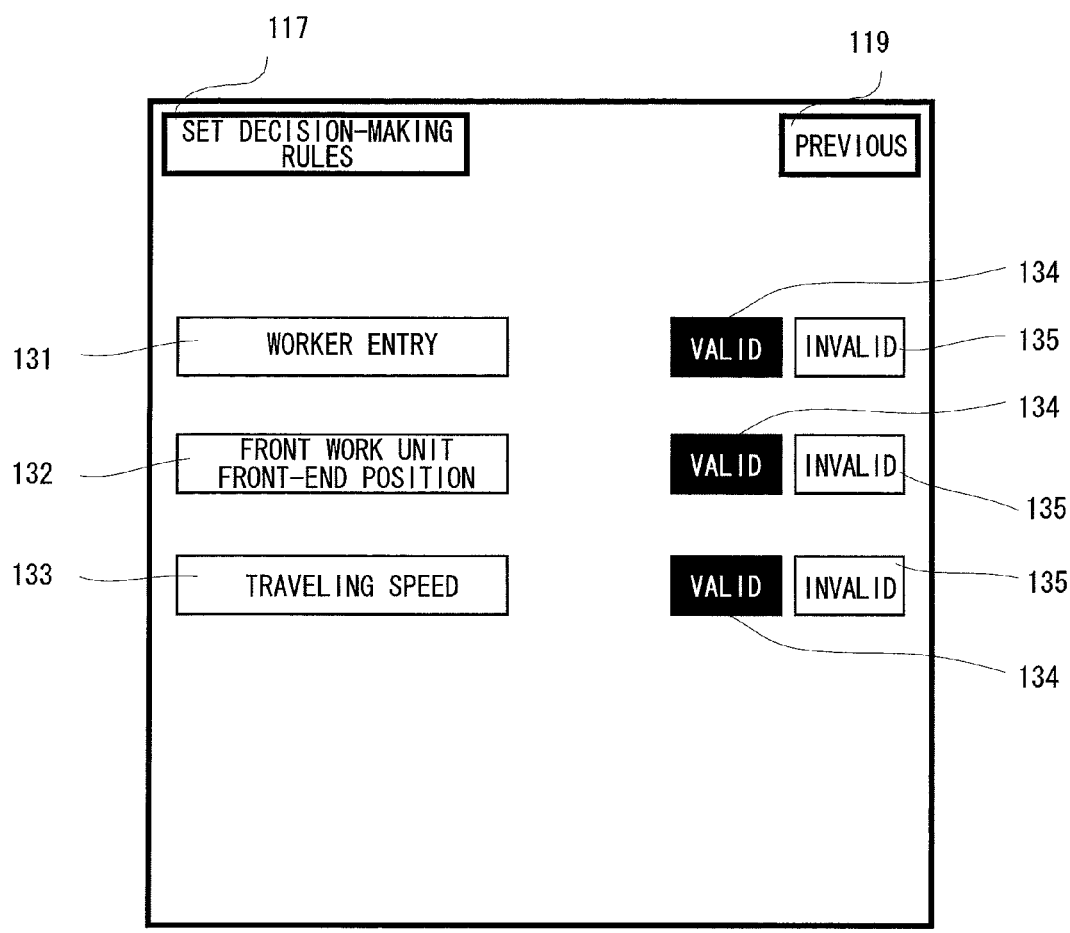

In the embodiment described above, the warning range 113 is set or adjusted by first selecting "set" in the screen shown in FIG. 7 or FIG. 8 so as to bring up on display the decision-making rule setting screen shown in FIG. 9 and then selecting "valid" for the "worker entry" so as to bring up the decision-making rule setting screen in the wide range display. In this screen, the sensitivity levels are adjusted for the wireless receivers 10a through 10c and the warning range 113 is altered by interlocking with the sensitivity adjustment.

However, the present invention is not limited to this example and the display range for the wide range display may be freely set by the operator without any adjustment of the warning range 113.

Figure 20:
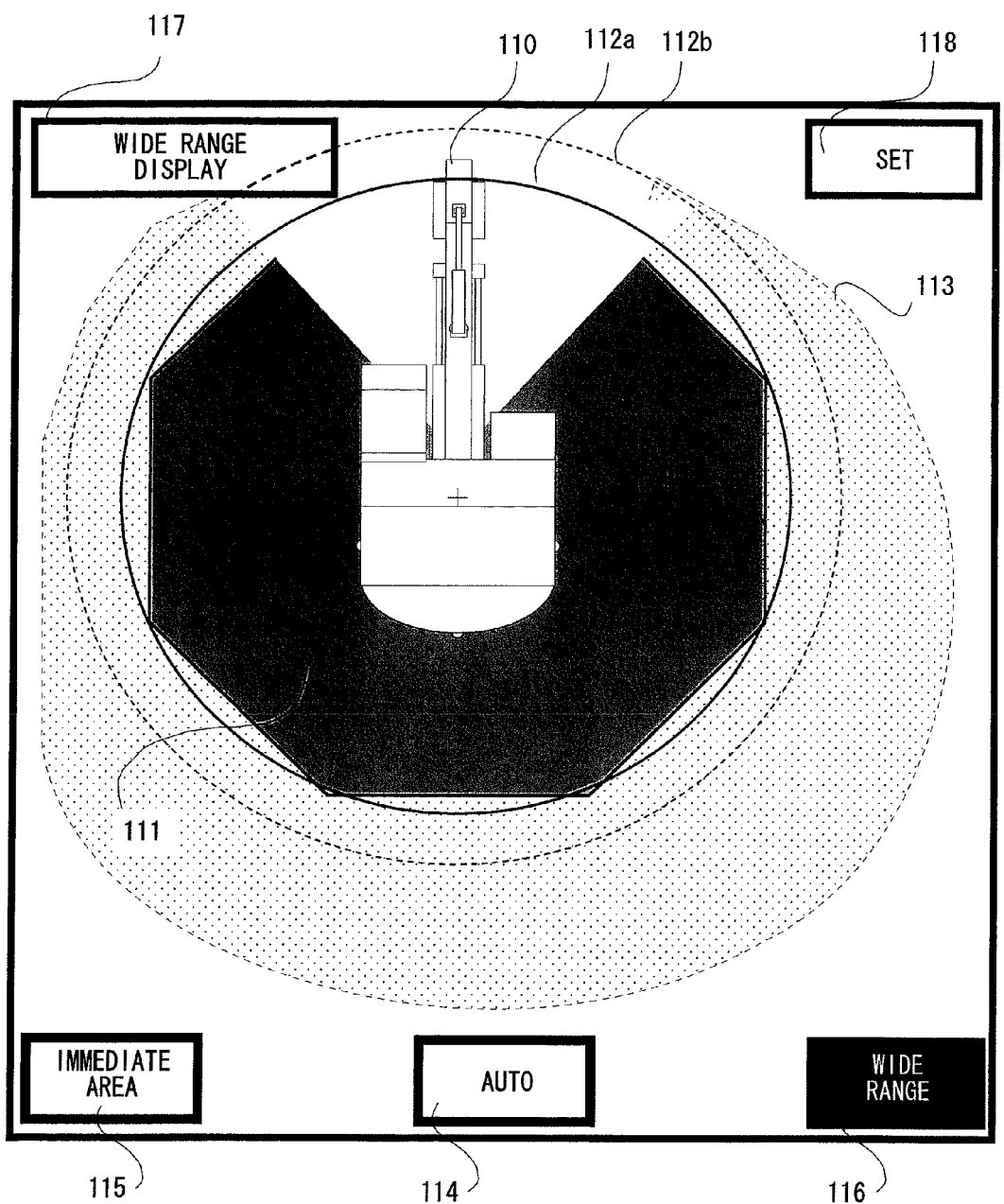
Figure 21:
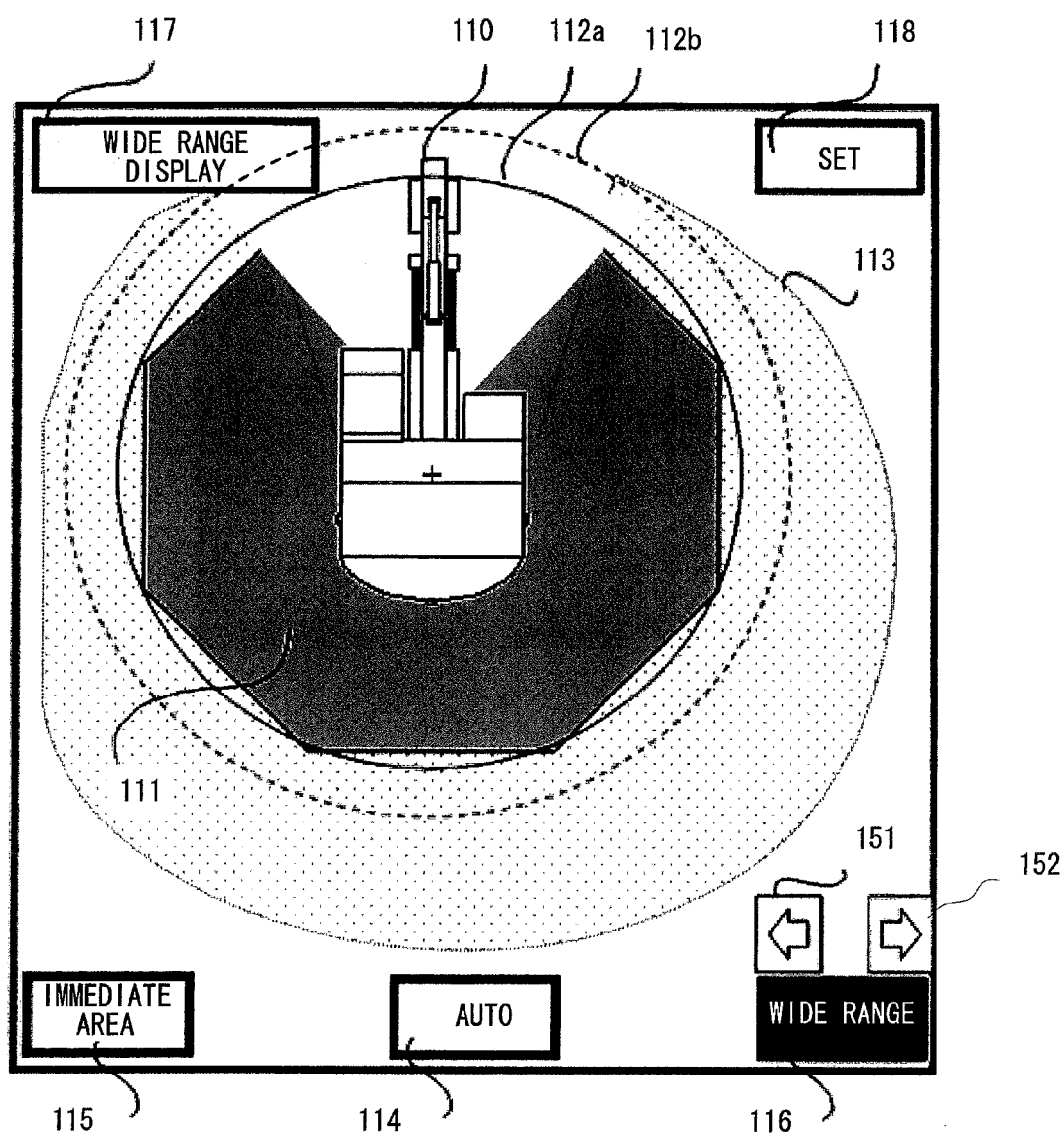
Figure 22:
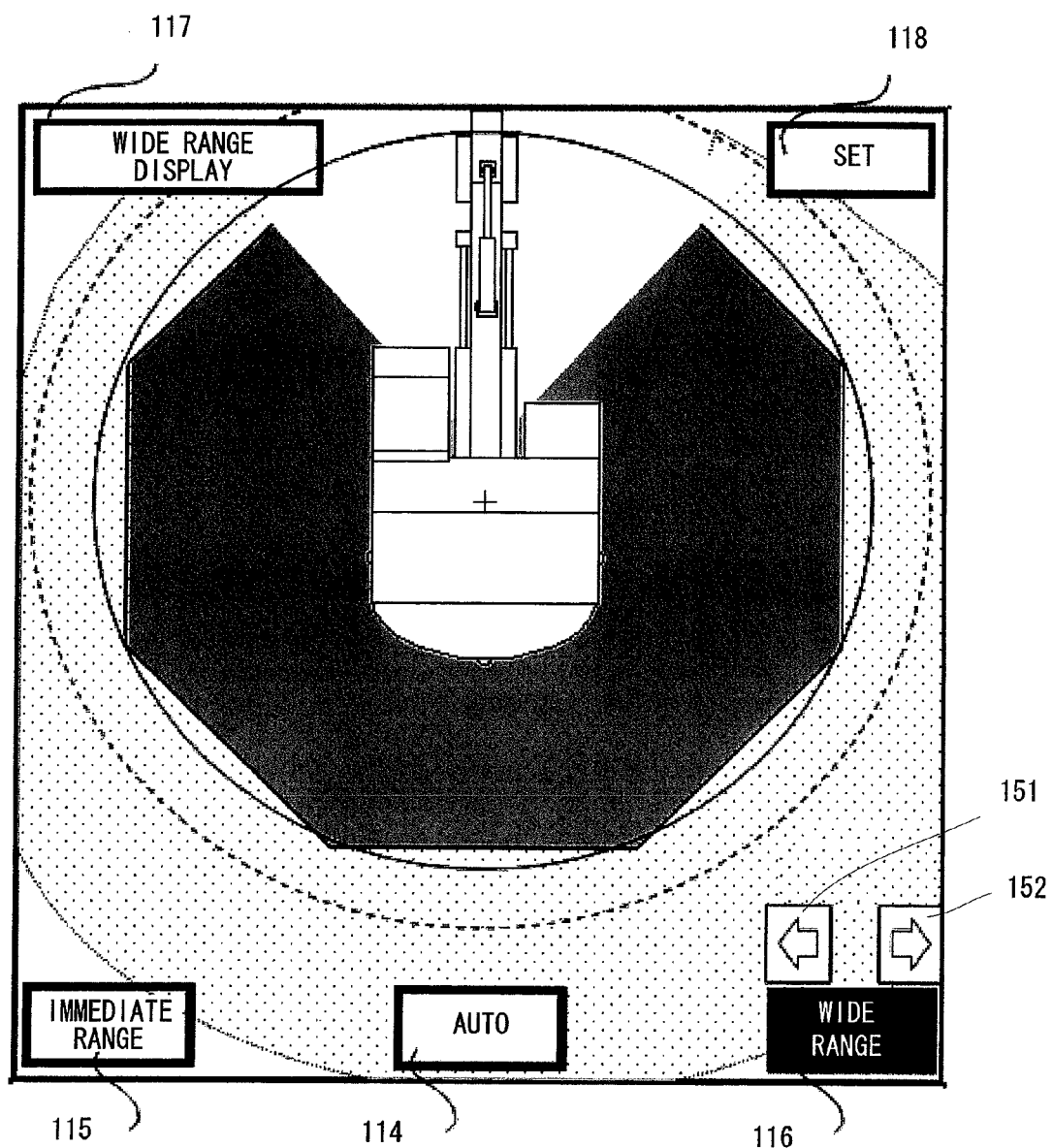

FIG. 20 shows the display screen in which "wide range" has been selected by operating the key input portion 116. The operator holds down "wide range" at the key input portion 116 so as to bring up on display a "←" key 151 and a "→" 152, as shown in FIG. 21. The image of the monitoring area is gradually enlarged, as shown in FIG. 22 as the operator continuously holds down the "←" key 151. The enlarged image of the monitoring area can be gradually reduced to the initial image size in FIG. 21 by holding down the "→" key 152.

This method allows the operator to adjust the monitoring area, relative to the sensitivity levels of the wireless receivers 10a through 10c, so as to suit user preferences. As a result, the operator is able to monitor the area surrounding the work machine with high work efficiency in correspondence to the work machine traveling speed and the conditions in the surrounding environment.

In addition, as an alternative to the wireless receiver carried by each worker, the position of a worker or an obstacle may be detected via a proximity sensor.

Figure 23:
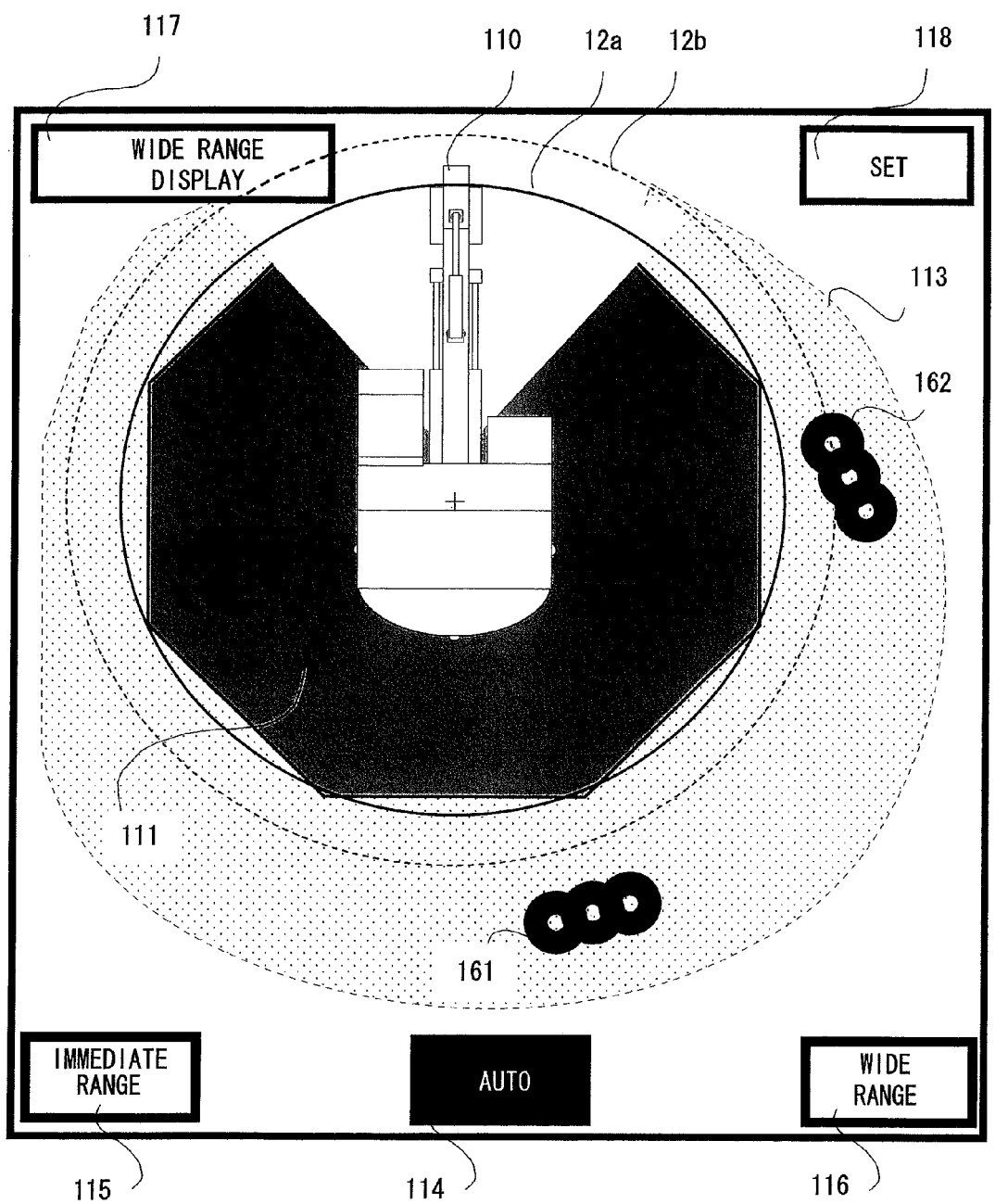
Figure 24:
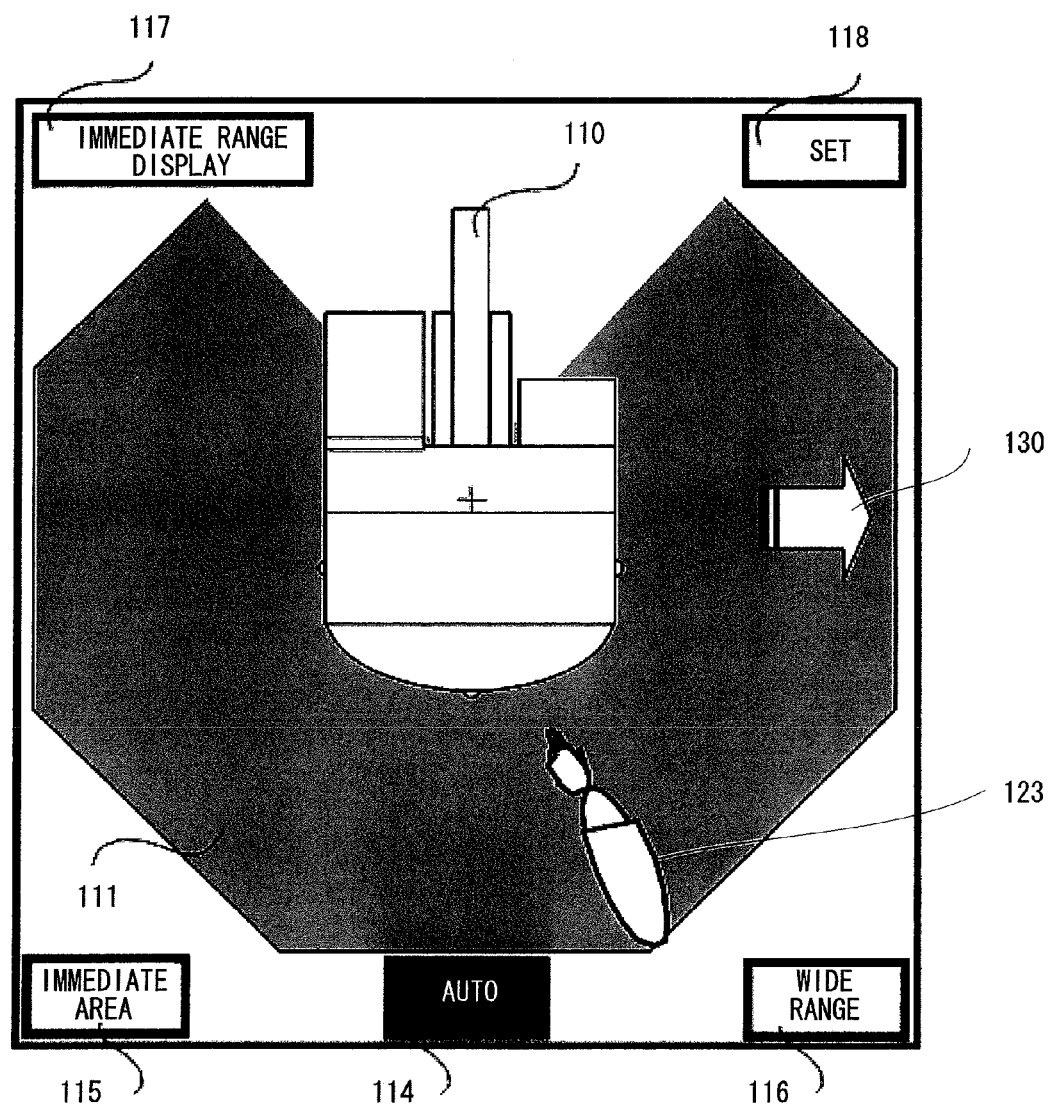

FIG. 23 shows a monitor image with obstacle marks 161 and 162 displayed at the positions of obstacles having been detected via proximity sensors. In this case, even if workers are located at the positions indicated by the obstacle marks 161 and 162, no worker information is provided on display. FIG. 24 shows a display screen with the obstacle mark 161 having moved into the surrounding image area 111. In this situation, a worker image 123 obtained by converting an image of the worker captured via the camera 10a, 10b or 10c, to a bird's eye view, is displayed in place of the obstacle mark 161. In addition, as long as the obstacle mark 162 in FIG. 23 remains outside the surrounding image area 111, an approaching mark 130, indicating that the obstacle is located outside the alarm range, is displayed in place of the obstacle mark 162 in the display screen in FIG. 24.

Detailed information pertaining to workers cannot be provided on display through this method. However, it does not require workers to carry special devices and thus, the area around the work machine can be monitored through a simpler system. Furthermore, since nobody needs to carry a special device, even a visitor who may enter the area unexpectedly can be monitored. Even though detailed information pertaining to workers cannot be displayed, the conditions in the area surrounding the work machine can be ascertained in detail in the immediate area monitor image. In addition, since the immediate area monitor image can be switched to the wide area monitor image and vice versa, advantages similar to those achieved in conjunction with the wireless receivers 10a through 10c described earlier can be realized.

It is to be noted that the installation positions and the quantities of wireless receivers 10a through 10c and the cameras 13a through 13c can be adjusted as needed from those in the embodiment described above. Furthermore, the number of monitoring areas, such as the warning area, the first and second alarm areas and the like, may be greater or smaller than that in the embodiment.

While the work machine is a hydraulic excavator in the embodiment described above, the present invention is not limited to this example and it may be embodied as a surrounding area monitoring device for monitoring an area around any of various types of work machines including a wheel loader and a crane.

In the embodiment described earlier, either the wide range display image shown in FIG. 7 or the immediate range display image shown in FIG. 8 is selected and brought up on display in the auto mode based upon whether or not any worker has entered the monitoring area (third area) 103 set in advance around the work machine, the drive condition of the front work unit in the work machine and the work machine traveling speed. However, the present invention is not limited to this example and it may be embodied by adopting any of the following modes.

(1) The wide range display image or the immediate range display image may be selected and brought up on display entirely based upon whether or not a worker has entered the third area 103 (the warning range 113 within the screen designated as the monitoring area.

(2) The wide range display image or the immediate range display image may be selected and brought up on display based upon whether or not a worker has entered the monitoring area 103 and the drive condition of the front work unit at the work machine.

(3) The wide range display image or the immediate range display image may be selected and brought up on display based upon whether or not a worker has entered the monitoring area and the work machine traveling speed.

(4) The wide range display image or the immediate range display image may be selected and brought up on display based upon whether or not a worker has entered the monitoring area and the work machine advancing direction.

(5) The wide range display image or the immediate range display image may be selected and brought up on display entirely based upon the drive condition of the front work unit at the work machine. In such a case, the wide range display image may be brought up on display while the front work unit is extending and the immediate range display image may be brought up on display while the front work unit is contracting.

(6) The wide range display image or the immediate range display image may be selected and brought up on display entirely based upon the work machine traveling speed. In such a case, the wide range display image may be brought up on display when the work machine traveling speed is high and the immediate range display image may be brought up on display when the work machine traveling speed is low.

(7) The wide range display image or the immediate range display image may be selected and brought up on display based upon the drive condition of the front work unit at the work machine and the work machine traveling speed.

In the embodiment described above, the wide range display image currently on display is switched to the immediate range display image in the auto mode upon determining that a worker has moved closer to the work machine beyond the boundary line 103a defining the third area 103. However, the present invention is not limited to this example and the wide range display image currently on display may be switched to the immediate range display image upon determining that a worker has moved closer to the work machine beyond the boundary defining the second area 102, instead.

The surrounding area monitoring device for monitoring an area around a work machine according to the present invention allows for numerous other variations without departing from the spirit and scope of the invention.

The disclosure of the following priority application is herein incorporated by reference:
Japanese Patent Application No. 2010-139088 filed Jun. 18, 2010

The invention claimed is:

1. A surrounding area monitoring device for monitoring an area around a work machine, comprising:
    a display device;
    a worker position detection unit that detects a position of a worker working around the work machine;
    an image capturing unit mounted at the work machine, which obtains a surrounding area image by capturing an image of an area around the work machine;
    an image conversion unit that converts the surrounding area image of the area around the work machine, obtained by the image capturing unit, to a bird's eye view image of the work machine;
    an image generation unit that generates a monitor image based upon the bird's eye view image resulting from conversion via the image conversion unit and the position of the worker detected by the worker position detection unit;
    a display control unit that displays the monitor image at the display device;
    a decision-making unit that makes a decision as to whether or not the position of the worker is located within a monitoring area set in advance; and
    a plurality of work machine condition detection units that detect an angle of an articulated, extensible front work unit provided at the work machine and one or more drive conditions of the work machine including
        at least one of a work machine traveling speed and
        a front work unit front-end position
    wherein the image generation unit generates a plurality of monitor images which show conditions within monitoring ranges with varying sizes based upon information provided from at least one of the work machine condition detection units
    if the decision-making unit decides that the position of the worker is located within the monitoring area, the monitoring ranges being set around the work machine,
    and the plurality of monitor images include an immediate range display image showing conditions in an immediate area set around the work machine
    and a wide range display image showing conditions in a wide area containing the immediate area also set around the work machine.

2. A surrounding area monitoring device for monitoring an area around a work machine according to claim 1, wherein: the decision-making unit makes a decision as to whether or not the position of the worker is located within the monitoring area by setting the wide area as the monitoring area.

3. A surrounding area monitoring device for monitoring an area around a work machine according to claim 1, wherein: the decision-making unit makes a decision as to whether or not the position of the worker is located within the monitoring area by setting the immediate area as the monitoring area.

4. A surrounding area monitoring device for monitoring an area around a work machine according to claim 1, further comprising: a first input unit that accepts an operation performed to enlarge or reduce the wide range display image currently on display at the display device, wherein:
the image generation unit alters a size of the wide range display image while the operation is accepted via the first input unit.

5. A surrounding area monitoring device for monitoring an area around a work machine according to claim 1, further comprising: a second input unit that enables a user to manually select either the immediate range display image or the wide range display image.

6. A surrounding area monitoring device for monitoring an area around a work machine according to claim 1, wherein: if the decision-making unit decides that the position of the worker is not located within the monitoring area, the image generation unit generates the wide range display image and the display control unit brings up the wide range display image on display at the display device.

7. A surrounding area monitoring device for monitoring an area around a work machine according to claim 1, wherein: even if the decision-making unit decides that the position of the worker is located within the monitoring area, the image generation unit generates the wide range display image and the display control unit brings up the wide range display image on display at the display device as long as the front work unit is detected to be extending via the work machine condition detection units.

8. A surrounding area monitoring device for monitoring an area around a work machine according to claim 1, wherein: even if the decision-making unit decides that the position of the worker is located within the monitoring area and the front work unit is detected to be contracting via the work machine condition detection units, the image generation unit generates the wide range display image and the display control unit brings up the wide range display image on display at the display device once the work machine traveling speed is detected to be higher than a predetermined speed via the work machine condition detection units.

9. A surrounding area monitoring device for monitoring an area around a work machine according to claim 1, wherein: the immediate range display image generated by the image generation unit is a bird's eye view image and the wide range display image is a display image that includes an image obtained by reducing the bird's eye view image and an image that shows conditions in a specific range outside the immediate area in schematic representation.

\* \* \* \* \*